United States Patent
Melman et al.

(10) Patent No.: US 9,711,804 B2
(45) Date of Patent: Jul. 18, 2017

(54) ELECTROLYTE REGENERATION

(71) Applicant: PHINERGY LTD., Lod (IL)

(72) Inventors: Avraham Melman, Holon (IL); Joel Lang, Givatayim (IL); Ilya Yakupov, Rehovot (IL)

(73) Assignee: PHINERGY LTD., Lod (IL)

( * ) Notice: Subject to any disclaimer, the term of this patent is extended or adjusted under 35 U.S.C. 154(b) by 0 days.

(21) Appl. No.: 14/903,511

(22) PCT Filed: Jul. 8, 2014

(86) PCT No.: PCT/IL2014/050616
§ 371 (c)(1),
(2) Date: Jan. 7, 2016

(87) PCT Pub. No.: WO2015/004663
PCT Pub. Date: Jan. 15, 2015

(65) Prior Publication Data

US 2016/0149231 A1    May 26, 2016

Related U.S. Application Data

(60) Provisional application No. 61/843,477, filed on Jul. 8, 2013.

(51) Int. Cl.
*H01M 6/50* (2006.01)
*H01M 12/06* (2006.01)
(Continued)

(52) U.S. Cl.
CPC .......... *H01M 6/5077* (2013.01); *B60L 11/18* (2013.01); *C25B 1/16* (2013.01); *C25B 9/08* (2013.01);
(Continued)

(58) Field of Classification Search
CPC .............. H01M 6/5077; H01M 12/06; H01M 10/4242; H01M 2220/20; C25B 1/16; C25B 9/08; B60L 11/18
See application file for complete search history.

(56) References Cited

U.S. PATENT DOCUMENTS 3,539,306 A   11/1970   Kumura et al.
3,653,704 A   4/1972   Hawkins
(Continued)

FOREIGN PATENT DOCUMENTS

EP   0093435 A1   11/1983
EP   0558900 A2   9/1993
(Continued)

OTHER PUBLICATIONS

International Search Report for PCT Application No. PCTIL2014050616 mailed Nov. 13, 2014.
(Continued)

*Primary Examiner* — Brittany Raymond
(74) *Attorney, Agent, or Firm* — Pearl Cohen Zedek Latzer Baratz LLP

(57) ABSTRACT

This invention is directed to electrolysis-based devices and methods for recycling of electrolyte solutions. Specifically, the invention is related to regeneration of spent electrolyte solutions comprising metal ions such as electrolyte solutions used in metal/air batteries.

8 Claims, 7 Drawing Sheets

(51) Int. Cl.
  *C25B 1/16* (2006.01)
  *C25B 9/08* (2006.01)
  *H01M 10/42* (2006.01)
  *B60L 11/18* (2006.01)

(52) U.S. Cl.
  CPC ........ *H01M 10/4242* (2013.01); *H01M 12/06* (2013.01); *H01M 2220/20* (2013.01)

(56) References Cited

U.S. PATENT DOCUMENTS

| | | | |
|---|---|---|---|
| 3,796,792 A | 3/1974 | Miyata et al. | |
| 3,879,523 A | 4/1975 | Miyata et al. | |
| 3,879,525 A | 4/1975 | Miyata et al. | |
| 3,912,775 A | 10/1975 | Broecker et al. | |
| 4,145,400 A | 3/1979 | Adsetts | |
| 4,454,244 A | 6/1984 | Woltermann | |
| 4,458,026 A | 7/1984 | Reichle et al. | |
| 4,482,542 A | 11/1984 | Schneider et al. | |
| 4,491,624 A | 1/1985 | Sarbacher | |
| 4,539,195 A | 9/1985 | Schanz et al. | |
| 4,774,212 A | 9/1988 | Drezdon | |
| 4,883,533 A | 11/1989 | Kosin et al. | |
| 4,904,457 A | 2/1990 | Misra | |
| 4,908,281 A | 3/1990 | O'Callaghan | |
| 4,970,191 A | 11/1990 | Schutz | |
| 5,075,087 A | 12/1991 | Kosin et al. | |
| 5,075,089 A | 12/1991 | Misra et al. | |
| 5,114,802 A | 5/1992 | O'Callaghan | |
| 5,250,279 A | 10/1993 | Preston et al. | |
| 5,348,725 A | 9/1994 | Misra et al. | |
| 5,376,471 A | 12/1994 | Hunter et al. | |
| 5,384,017 A | 1/1995 | Lumbroso | |
| 5,399,329 A | 3/1995 | Schutz et al. | |
| 5,437,720 A | 8/1995 | Cox et al. | |
| 5,484,512 A | 1/1996 | Sasaki et al. | |
| 5,484,583 A | 1/1996 | Grubbs et al. | |
| 5,514,361 A | 5/1996 | Martin et al. | |
| 5,578,286 A | 11/1996 | Martin et al. | |
| 5,595,504 A | 1/1997 | Muller | |
| 5,645,810 A | 7/1997 | Easley | |
| 5,728,363 A | 3/1998 | Martin et al. | |
| 5,750,453 A | 5/1998 | Easley et al. | |
| 5,776,424 A | 7/1998 | Martin et al. | |
| 5,814,291 A | 9/1998 | Kelkar | |
| 5,882,622 A | 3/1999 | Easley et al. | |
| 5,955,048 A | 9/1999 | Cedro, III et al. | |
| 6,028,023 A | 2/2000 | Vierheilig | |
| 6,376,405 B1 | 4/2002 | Stamires et al. | |
| 6,468,488 B1 | 10/2002 | Stamires et al. | |
| 6,514,473 B2 | 2/2003 | Noweck et al. | |
| 6,593,265 B2 | 7/2003 | Stamires et al. | |
| 7,361,264 B2 | 4/2008 | Vierheilig | |
| 7,740,828 B2 | 6/2010 | Sanchez-Valente et al. | |
| 7,897,136 B2 | 3/2011 | Eisgruber et al. | |
| 8,142,938 B2 | 3/2012 | Khasin et al. | |
| 8,409,540 B2 | 4/2013 | Kwon et al. | |
| 8,623,320 B2 | 1/2014 | Song et al. | |
| 2002/0051898 A1 | 5/2002 | Moulthrop et al. | |
| 2002/0179456 A1 | 12/2002 | Yamashita et al. | |
| 2004/0126631 A1 | 7/2004 | Uchida et al. | |
| 2010/0233786 A1 | 9/2010 | O'Connor | |
| 2011/0045385 A1 | 2/2011 | Makita | |
| 2013/0206606 A1* | 8/2013 | Gilliam | C25B 1/00 205/351 |
| 2014/0131217 A1* | 5/2014 | Buschmann | C01B 7/01 205/440 |
| 2014/0287329 A1* | 9/2014 | Tsukda | H01M 6/5077 429/409 |
| 2015/0207150 A1 | 7/2015 | Lang et al. | |

FOREIGN PATENT DOCUMENTS

| | | |
|---|---|---|
| EP | 0564664 A1 | 10/1993 |
| EP | 0947021 B1 | 12/2001 |
| JP | S 62108475 | 5/1987 |
| JP | H1163977 | 3/1999 |
| JP | 2000-030721 | 12/1999 |
| JP | 2001-266961 | 9/2001 |
| JP | 2009-231238 A | 10/2009 |
| JP | 2011-258489 | 12/2011 |
| KR | 20130055635 | 5/2013 |
| ZA | 200204013 | 7/2003 |

OTHER PUBLICATIONS

Xu et al. "Ion exchange membranes: State of their development and perspective", Journal of Membrane Science 263 (2005) 1-29.
Supplementary European Search Report for European Application No. 14823567.4 dated Jun. 16, 2016.

\* cited by examiner

ELECTROLYTE REGENERATION

CROSS-REFERENCE TO RELATED APPLICATIONS

This application is a National Phase Application of PCT International Application No. PCT/IL2014/050616, International Filing Date Jul. 8, 2014, claiming priority to and benefit of U.S. Provisional Application Ser. No. 61/843,477 filed on Jul. 8, 2013, the contents of which are herein incorporated by reference in their entireties.

FIELD OF THE INVENTION

This invention relates to an electrolysis-based process for recycling of solutions comprising metal ions. Specifically, the invention is related to regeneration of spent electrolyte solutions comprising metal ions, such as alkaline electrolyte solutions used in metal/air batteries or in hydrogen generators. Processes of this invention include regeneration of electrolyte to a level allowing subsequent use.

BACKGROUND OF THE INVENTION

Metal-air electrochemical power sources, particularly Al-air batteries and fuel cells with alkaline electrolyte are suitable for electric vehicles, unmanned aerial vehicles (UAV), reserve and emergency power supply and other applications.

Metal-air system with alkaline electrolyte has a great electrochemical capacity (about 8 k Wh/kg). However, during the operation of metal-Air batteries, metal hydroxide such as aluminum hydroxide and soluble ions such as aluminates (e.g. $K^+[Al(OH)_4]^-$) in the case of aluminum-air battery are formed in the electrolyte solution by dissolution of metal from the anode. This process lowers the efficiency of the metal-air battery. Accordingly, following a certain operation time, the electrolyte solution needs to be replaced or regenerated.

One factor that makes electrolyte regeneration challenging is that most of the aluminum in the spent electrolyte is present in the form of aluminates and therefore is difficult to separate from the used electrolyte solution.

In its most general form, the operation of metal/air electrochemical cell is based on the reduction of oxygen, which takes place at the cathode, and on the oxidation of metallic anode. The aqueous electrolyte present in the cell is preferably a highly alkaline solution, e.g., highly concentrated potassium hydroxide solution. A typical structure of a metal/air battery is schematically shown in FIG. 1, in which the air cathode, the consumable metallic anode and the electrolyte are shown. These components (the cathode, anode and electrolyte) are described in more detail below.

A commonly used air cathode consists of (i) an electronically conductive screen, an expanded foil or a metallic foam which serves as a current collector, (ii) active electrode particles provided within or surrounding the current collector (including a catalyst for promoting the reduction of oxygen) and (iii) hydrophobic porous film (for example PTFE, Teflon®) supported on one face of said screen or foil. One face of the air cathode is exposed to oxygen source (e.g., air) and the other face of the air cathode is exposed to the alkaline electrolyte. The air cathode is permeable to air, but its external face is hydrophobic and impermeable to the aqueous electrolyte.

The anode immersed in the electrolyte is made of metals such as aluminum, zinc, magnesium, iron and alloys thereof. When aluminum anode is used, then the cell is a primary cell, i.e., recharging of the cell is effected by replacing the spent aluminum anode with a fresh anode. In the case of zinc anode, both primary and secondary cells are known.

Turning now to the electrolyte, in aluminum/air batteries for example, it is generally held in a reservoir placed externally to the battery, and it flows to and from the cell stack utilizing a suitable circulation system. It is noted that the oxidation reaction of an aluminum anode in an alkaline electrolyte (e.g., potassium hydroxide) results in the formation of the aluminate ion $[Al(OH)_4]^-$ as shown below:

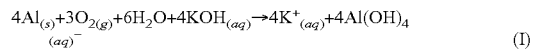

$$4Al_{(s)} + 3O_{2(g)} + 6H_2O + 4KOH_{(aq)} \rightarrow 4K^+_{(aq)} + 4Al(OH)_{4(aq)}^- \quad (I)$$

During discharge, i.e., energy generation, as the concentration of the aluminate within the recirculating electrolyte increases, the battery voltage decreases, due to the reduction in the ionic conductivity of the electrolyte and lack of free hydroxide ions. Thus, the operability of the electrolyte solution deteriorates gradually with time of operation and once it drops below an acceptable level, the spent electrolyte consisting of the aluminate solution is removed from the reservoir and fresh alkaline electrolyte is introduced into the reservoir.

In U.S. Pat. No. 4,908,281 it is explained that after the dissolved aluminate exceeds saturation level, the precipitation of solids takes place in the recirculating alkaline electrolyte due to the following reaction:

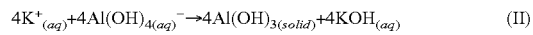

$$4K^+_{(aq)} + 4Al(OH)_{4(aq)}^- \rightarrow 4Al(OH)_{3(solid)} + 4KOH_{(aq)} \quad (II)$$

Reaction (II) is therefore supposed to release potassium hydroxide from the corresponding aluminate and concurrently form a precipitate of aluminum hydroxide. However, experimental work carried out at our laboratories in connection with the present invention indicates that the spent aluminate-containing electrolyte is not easily separable into potassium hydroxide and aluminum hydroxide. FIG. 2 is a bar diagram illustrating the composition of a fresh electrolyte consisting of 30% w/w aqueous potassium hydroxide solution (left bar) and a spent electrolyte withdrawn from an aluminum/air battery (right bar). The results indicate that in the spent electrolyte most of the potassium hydroxide is bound within the potassium aluminate, with only minor fraction being available in a free form (KOH free). Likewise, the quantity of the solid phase (the aluminate-containing precipitate) is small.

Consequently, the release of potassium hydroxide from spent electrolyte, such that it may be recycled and reused in the metal/air battery, poses a challenge to the rapidly developing electric vehicle industry where such batteries are employed for powering vehicles. A feasible method for regenerating potassium hydroxide from spent potassium aluminate solution would constitute a major advancement in metal/air battery technology.

SUMMARY OF THE INVENTION

This invention provides methods, devices and systems for recycling of solutions comprising metal ions. Specifically, the invention provides systems and methods for regeneration of spent electrolyte solutions comprising metal ions, such as alkaline electrolyte solutions used in metal/air batteries or in hydrogen generators. Processes of this invention include regeneration of electrolyte to a level allowing subsequent use.

In one embodiment, this invention provides a method for regenerating spent electrolyte solution, the method comprising:

providing a membrane electrolysis cell comprising:
  an anode;
  an oxygen-consuming cathode;
  a cation exchange membrane placed in the space between said anode and said cathode, said membrane defining an anode compartment and cathode compartment.
filling the spent electrolyte into the anode compartment to form an anolyte solution;
filling alkaline solution into the cathode compartment to form a catholyte solution;
passing an electric current through said membrane electrolysis cell thus reducing the concentration of alkali hydroxide in said anolyte solution and increasing the concentration of alkali hydroxide in said catholyte solution.

In one embodiment, this invention provides a method for regenerating spent electrolyte solution, the method comprising:
  providing a first and a second membrane electrolysis cells, each cell comprising:
    an anode;
    an oxygen-consuming cathode;
    a cation exchange membrane placed in the space between said anode and said cathode, said membrane defining an anode compartment and cathode compartment.
  filling said spent electrolyte into said anode compartment of said first cell to form a first anolyte solution;
  filling alkaline solution into said cathode compartment of said first cell to form a first catholyte solution;
  passing an electric current through said first membrane electrolysis cell thus reducing the concentration of alkali hydroxide in said first anolyte solution and increasing the concentration of alkali hydroxide in said first catholyte solution;
  filling the first anolyte solution into said anode compartment of the second cell to form a anolyte solution;
  filling the first catholyte solution into said cathode compartment of said second cell to form a catholyte solution;
  passing an electric current through said second membrane electrolysis cell thus reducing the concentration of alkali hydroxide in said second anolyte solution and increasing the concentration of alkali hydroxide in said second catholyte solution.

In one embodiment, this invention provides an electrolyte regeneration device comprising membrane electrolysis cell having an anode and an oxygen-consuming cathode, with cation exchange membrane placed in the space between said anode and cathode defining an anode compartment and cathode compartment.

In one embodiment, this invention provides an electrochemical energy generation apparatus comprising:
(i) metal/air battery provided with a reservoir for circulating electrolyte;
(ii) an electrolyte regeneration device comprising membrane electrolysis cell having an anode and an oxygen-consuming cathode, with cation exchange membrane placed in the space between said anode and cathode defining an anode compartment and cathode compartment, wherein at least one of the compartments of the membrane electrolysis cell is in fluid communication with the electrolyte reservoir of the metal/air battery.

In one embodiment, this invention provides an electric vehicle powered by metal/air battery and optionally by means of other power sources, characterized in that a reservoir for holding the electrolyte of said metal/air battery is in fluid communication with an electrolyte regeneration device powered by electricity.

In one embodiment, this invention provides a method for regenerating, in an electric vehicle service station, an electrolyte of a metal/air battery of an electric vehicle arriving at said service station, the method comprises removing spent electrolyte from a reservoir connected to the metal/air battery mounted in the vehicle, regenerating the electrolyte by means of electrolysis and feeding a regenerated electrolyte or a fresh electrolyte to the reservoir.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
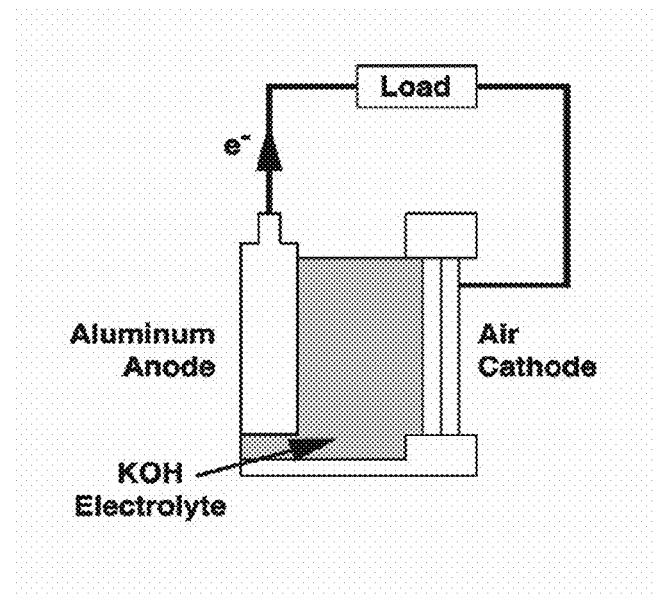
FIG. 1 is a schematic metal-air cell.
Figure 2:
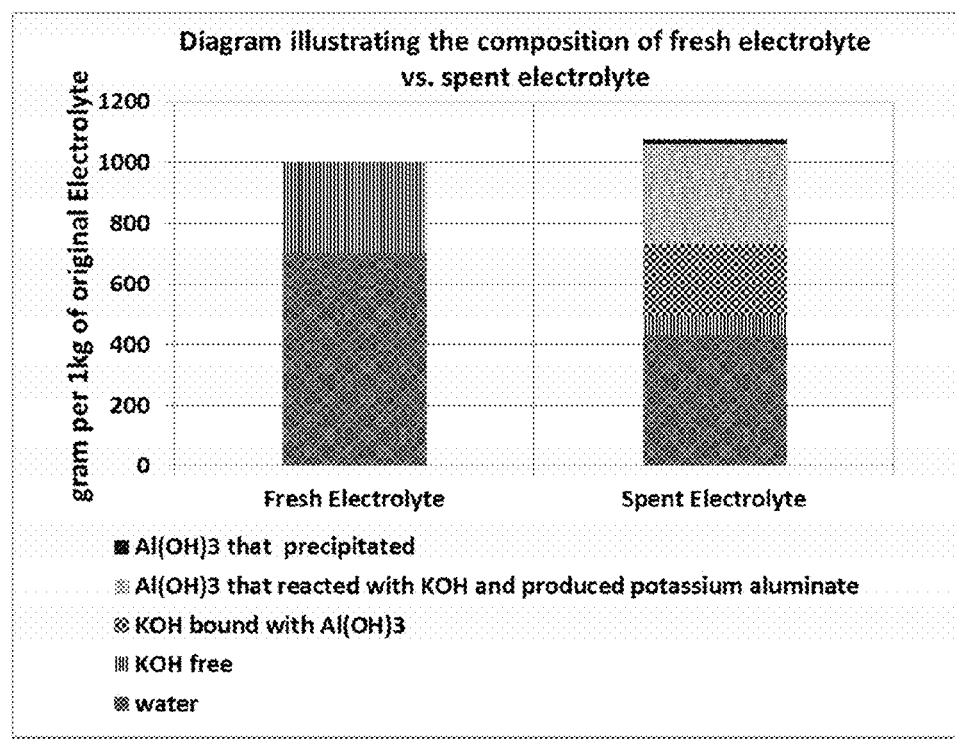
FIG. 2 shows the composition of fresh electrolyte vs. spent electrolyte.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

One aspect of this invention is the regeneration of spent electrolyte using an electrolysis process.

It has now been found that an alkaline solution is separable and recoverable from an aqueous aluminate solution by means of electrolysis-based method. According to this aspect of the invention, membrane electrolysis cell which employs an oxygen-consuming cathode can be used to recover alkaline solutions (e.g., potassium hydroxide or sodium hydroxide) from aqueous solutions of hydroxide complex anions that are soluble in moderately strong alkaline environment, e.g., hydroxide complex anions of the formula $[M(OH)_n]^{-p}$, wherein M indicates a metal, n is an integer equal to or greater than 3 and p is an integer equal to or greater than 1 (e.g., p equals 1 or 2). More specifically, M indicates a metal which forms sparingly soluble or water insoluble hydroxide of the formula $M(OH)_m$ (m<n). Thus, the method of the invention can be used to recover alkali hydroxide solutions from alkali salts of anions of amphiprotic hydroxides, such as the aluminate ion $Al(OH)_4^-$, zincate ion $Zn(OH)_4^{2-}$ and stannite ion $Sn(OH)_3^-$ [the corresponding amphiprotic hydroxides are $Al(OH)_3$, $Zn(OH)_2$ and $Sn(OH)_2$, respectively]. It should be understood that the hydroxide complex anions may be hydrated; for the purpose of simplicity, water molecules are not indicated in the abovementioned formulas.

The experimental work reported below indicates that when electrical current is passed through a membrane electrolysis cell provided with oxygen-consuming cathode and operating with $K[Al(OH)_4]$ solution as the anolyte, then elemental oxygen evolves at the anode, due to the oxidation of hydroxyl ions, concurrently with the precipitation of $Al(OH)_3$ from the anolyte solution, while at the cathode, oxygen (for example, atmospheric oxygen) is reduced to form hydroxyl ions. With potassium ions continually migrating from the anode side across the cation exchange membrane to the cathode side, potassium hydroxide solution is progressively formed and collected on the cathodic side of the cell. On reaching sufficiently high concentrated potassium hydroxide solution, for example, with a concentration of not less than 5%, the catholyte can be removed from the cell and recycled to the reservoir of a metal/air battery.

In some applications, for electrolytic recovery of potassium hydroxide to be feasible, hydrogen generation at the cathode must be restrained as much as possible. Notably, the evolution of elemental hydrogen at the cathode is not observed during the electrolysis of $K[Al(OH)_4]$ solution in a membrane electrolysis cell employing oxygen-consuming cathode. For the purpose of comparison it is noted that when conventional production of 1 liter of 30% KOH W/W from 1% KOH W/W takes place, then approximately 83 liters of hydrogen gas are produced at the cathode at STP conditions.

The reactions which take place in the membrane electrolysis cell according to the invention can therefore be summarized as follows. At the anode, hydroxyl ions are oxidized and oxygen evolves in accordance with the following reaction:

$$4OH^-_{(aq)} \rightarrow O_{2(g)} + 2H_2O + 4e$$

In the anolyte, aluminum hydroxide precipitates:

$$[Al(OH)_4]^-_{(aq)} \rightarrow Al(OH)_{3(s)} + OH^-_{(aq)}$$

At the cathode, oxygen (for example, atmospheric oxygen or alternatively, elemental oxygen supplied from the anode side) is consumed and hydroxyl ions are formed:

$$O_{2(g)} + 4e^- + 2H_2O \rightarrow 4OH^-$$

Accordingly, one aspect of the invention is a method comprising passing an electric current through a membrane electrolysis cell provided with an air-consuming cathode, wherein the anolyte solution of said cell contains an alkali salt of hydroxide complex anion, reducing the concentration of alkali hydroxide in said anolyte solution and increasing the concentration of alkali hydroxide in said catholyte solution. These concentration changes are the result of current passage through the cell.

The hydroxide complex anion is typically of the formula $[M(OH)_n]^{-p}$, namely, $[M(OH)_n]^{-1}$ or $[M(OH)_n]^{-2}$, wherein M is a multivalent metal cation (such as $Al^{+3}$ or $Zn^{+2}$) and n is an integer equal to or greater than 3.

In one embodiment, this invention provides a method for regenerating spent electrolyte solution, the method comprising:
  providing a membrane electrolysis cell comprising:
    an anode;
    an oxygen-consuming cathode;
    a cation exchange membrane placed in the space between the anode and the cathode, said membrane defining an anode compartment and cathode compartment.
  filling the spent electrolyte into said anode compartment to form an anolyte solution;
  filling alkaline solution into said cathode compartment to form a catholyte solution;
  passing an electric current through said membrane electrolysis cell thus reducing the concentration of alkali hydroxide in said anolyte solution and increasing the concentration of alkali hydroxide in said catholyte solution.

In one embodiment, the anolyte solution comprises an alkali salt of hydroxide complex anion. In one embodiment, the hydroxide complex anion has the formula $[M(OH)n]^{-p}$, wherein M is a multivalent metal cation, n is an integer equal to or greater than 3 and p is 1 or 2. In one embodiment, the increase of the alkali hydroxide concentration in the catholyte yields a concentrated alkali hydroxide solution in the catholyte. The concentrated alkali hydroxide solution generated at the cathode compartment of the membrane electrolysis cell is usable as an electrolyte for metal/air battery. In one embodiment, elemental oxygen evolving at the anode side of said membrane electrolysis cell is supplied to the outer face of said oxygen-consuming cathode. In one embodiment, the anolyte solution is being supplied from an electrolyte reservoir of a metal/air battery; and the concentration of the catholyte solution increases gradually to form a concentrated alkali hydroxide solution; and wherein at least a portion of the resultant concentrated alkali hydroxide solution is added to an electrolyte of a metal/air battery.

More specifically, one aspect of the invention is a method comprising:
  providing a membrane electrolysis cell which includes spaced-apart anode and oxygen-consuming cathode, with cation exchange membrane separating between said electrodes, thereby defining an anodic side and a cathodic side;
  placing in the anodic side spent electrolyte of a metal/air battery, said electrolyte consisting of an aqueous solution of hydroxide complex anion in the form of its alkali salt, e.g., $K[Al(OH)_4]$ or $Na[Al(OH)_4]$ or a mixture thereof;
  placing in the cathodic side an alkali hydroxide solution;
  passing an electrical current through the cell;
  generating a concentrated alkali hydroxide solution at the cathodic side; and
  using the same as the electrolyte of a metal/air battery.

In one embodiment, generating a concentrated alkali hydroxide solution at the cathodic side means increasing the concentration of alkali hydroxide in the catholyte solution.

Another aspect of the invention is a device comprising membrane electrolysis cell having spaced-apart anode and oxygen-consuming cathode, with cation exchange membrane placed in the space between said anode and cathode defining an anode compartment and cathode compartment.

Figure 3:
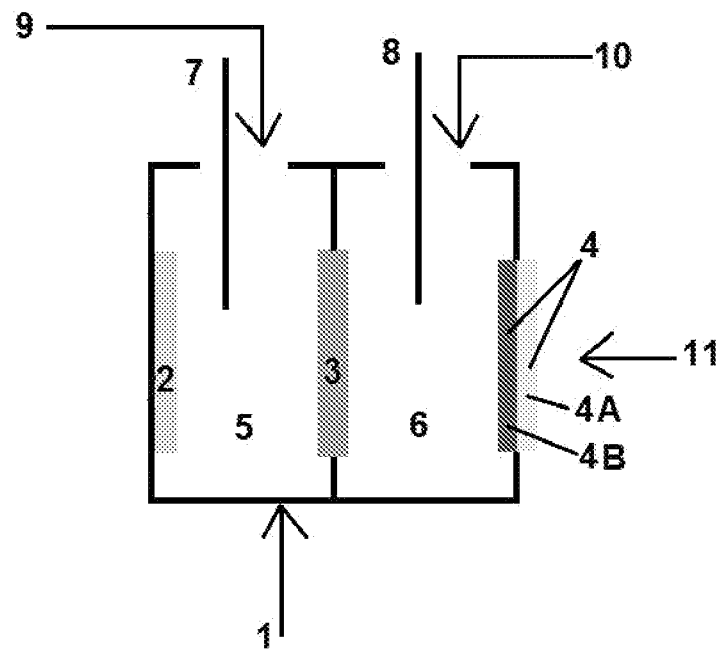
FIG. 3 is a schematic of an electrolysis cell of the invention.
Figure 4:
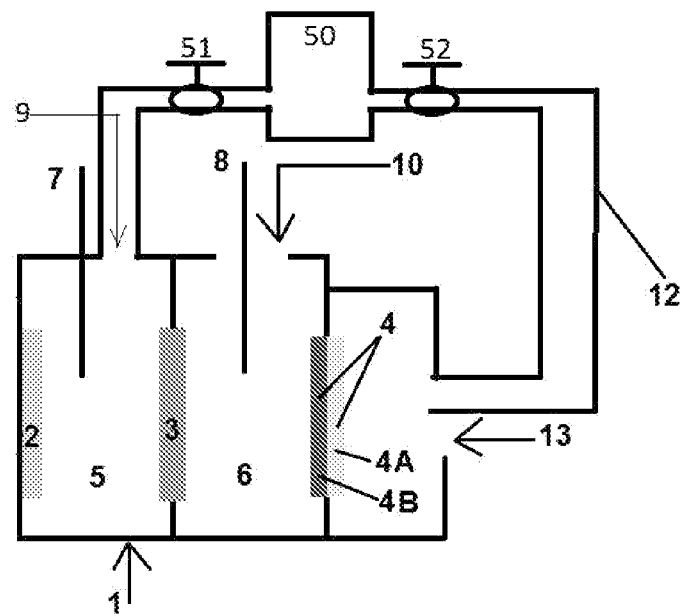
FIG. 4 is a schematic of an electrolysis cell of the invention.

A schematic illustration of an appropriate membrane electrolysis cell configuration is illustrated in FIG. 3. The membrane electrolysis cell (1) operable in the present invention consists of anodic and cathodic compartments (5) and (6), respectively, with numerals (2) and (4) indicating the anode and cathode, respectively. The cell is divided by means of a cation permeable membrane (3). The anodic and cathodic compartments are provided with openings (9) and (10), e.g., at their upper sections. However, additional openings can be located at the bottom of these compartments, allowing an easy discharge of the reaction products from the cell. The membrane electrolysis cell (1) is enclosed within a housing (not shown) equipped with suitable means to enable an outside air supply to the outer face of the cathode provided with the gas diffusion layer (4A). In an alternative configuration shown in FIG. 4, a conduit (12) extending from opening (9) to the outer face 4A of the cathode is used to channel oxygen evolving on the anode to said air cathode, thereby intensifying the supply of oxygen to the cathode. For example, oxygen produced at the anode may be stored in storage tank (50) and its flow from the anode side to the outer face 4A can be controlled by suitable means, e.g. valves 51 and 52. The amount of oxygen transferred from storage tank (50) to the cathode side can therefore be adjusted to meet production needs.

The anode (2) is generally provided in the form of a thin plate, e.g., about 0.05 mm to 2.5 mm thick. The anode material preferably exhibits low oxygen evolution overpotential; suitable anodes may be made of metals, metal oxides or alloys such as nickel, silver, silver oxide, ruthenium oxide, nickel cobalt oxide and platinum oxide.

The cathode (4) is a gas diffusion electrode, the structure of which is well known in the art. For example, suitable electrodes are commercially available from Electric Fuel Corporation and Fuelcellearth. An air electrode was also described in general terms above in connection with the metal/air battery of FIG. 1. Numerals 4A and 4B indicate the outer face, i.e., the gas diffusion layer exposed to atmospheric oxygen and the inner face in contact with the electrolyte, respectively. For example, a suitable air cathode is described in U.S. Pat. No. 8,142,938, where an oxygen-reducing catalyst consisting of a mixture of silver/zirconium oxide particles is loaded, together with a binder, onto a woven nickel grid which functions both as a current collector and supporting member of the electrode. Another suitable cathode assembly consists of a perforated, essentially planar member having an electrode active material applied within the pores thereof, with an electronically conductive metal frame surrounding the perimeter of said perforated member. A hydrophobic film is attached to one face of the of the electrode assembly. The electrode active material may contain the silver/zirconium oxide particles as described in U.S. Pat. No. 8,142,938, but other particles capable of promoting oxygen reduction can also be used (e.g., platinum particles, manganese dioxide). An electrode assembly suitable for use as an air cathode in the membrane electrolysis cell can be fabricated by means of printing techniques known in the art. One fabrication method is illustrated in detail below.

The membrane (3) positioned in the cell should allow the transport of alkali cation (e.g., $K^+$, $Na^+$) from the anolyte across the membrane to the catholyte. Cation-exchange membranes (which generally have negatively charged groups affixed on their surface) that are suitable for use in the invention preferably meet one or more of the following characteristics: good mechanical strength, low ionic resistance to cations and high ionic resistance to anions and good chemical stability in an alkaline environment. The properties of numerous commercially available ion-exchange membranes can be found, for example, in a review published in Journal of Membrane Science 263 p. 1-29 (2005). For example, Neosepta CMX (manufactured by Tokuyama Co., Japan), which is mentioned at the bottom of Table 3 in said reference, can be used.

The anodic and cathodic compartments are optionally equipped with thermometers (7, 8) immersed in the electrolyte solutions for detecting temperature changes occurring during the electrolysis. It should be noted the experimental results reported below indicate a moderate increase at the temperature of the solution due to the passage of an electric current through a small lab scale cell. On an industrial scale, the measurement of the temperature may be used to generate an automatic feedback signal triggering the activation of heating/cooling means once the measurement of the temperature indicates a value outside a working range (that may vary for different applications). In general, the temperature may be kept within the range from 15° C. to 95° C.

In operation, an aqueous solution of an alkali salt of hydroxide complex anion, e.g., of the formula $[M(OH)_n]^-$ or $[M(OH)_n]^{2-}$, such as $K[Al(OH)_4]$ obtained from a spent electrolyte solution, is fed through opening (9) to the anodic side (5) of the membrane electrolysis cell (1). It should be noted that the spent electrolyte removed from aluminum/air batteries usually exhibits some cloudiness, due to the precipitation of the metal hydroxide. The cloudy spent electrolyte may be subjected directly to the electrolysis according to the invention, or alternatively, a clear aqueous phase is recovered from the spent electrolyte, e.g., by employing conventional solid/liquid separation techniques such as filtration or centrifugation, such that a clear $K[Al(OH)_4]$ solution is employed as the anolyte according to the invention. Typically, the concentration of the anolyte is 20-250 gr Al/liter (for example, 1-7M Al). It should be noted that during the electrolysis according to the invention, metal hydroxide (e.g., $Al(OH)_3$) precipitates and accumulates in the anolyte solution and therefore according to continuous mode of operation described in detail below, the anolyte solution is caused to flow through a circulation line provided with solid/liquid separation means for separating the precipitate from the aqueous phase and returning a clear solution to the anodic side.

As a starting catholyte solution, an alkali hydroxide solution with initial concentration ($C_i$) of not less than 1 wt %, preferably of not less than 3 wt %, for example, in the range from 1% to 30 wt %, more preferably from 5% to 20 wt %, is generally used. The lower the concentration of the starting catholyte solution, the larger the amount of energy that need to be supplied to the cell in order to ultimately arrive at a sufficiently concentrated solution suitable for use as the electrolyte in an aluminum/air battery. In general, the electrolysis according to the invention may be terminated after the final concentration of the alkali hydroxide at the cathodic side ($C_f$) is increased by at least 1% ($C_f \geq C_i + 1$). However, it is generally preferred to allow the process to continue until the concentration of the catholyte is not less than 10 wt %, for example, from 10 wt % to 40%. Upon reaching the desired concentration, the catholyte solution is removed from the cathodic side (6) cell and transferred to a storage reservoir (not shown). It should be noted that a portion of the stored, concentrated alkali hydroxide solution may be diluted with fresh water to form a starting catholyte solution for the next production cycle.

Small, laboratory scale cells may be operated in accordance with the method of the invention for not less than 0.5 hours at a current density in the range from 0.01 to 0.5 A/cm$^2$. Constant current density may be applied throughout the electrolysis, or the measured voltage may be used to provide one or more feedback signals to the electrolytic cell in order to adjust its operation, i.e., to reduce or increase the current density.

In the foregoing description, the method of the invention has been illustrated in connection with a batch mode of operation. However, the membrane electrolysis cell (1) illustrated in FIGS. 3 and 4 can be incorporated into a device allowing the semi-continuous or continuous recovery of an alkali solution, which solution can be ultimately added to the electrolyte reservoir of a metal/air battery.

Accordingly, another aspect of the invention is a method comprising:
passing an electric current through a membrane electrolysis cell having an anode compartment and a cathode compartment separated by a cation exchange membrane;
recirculating through said anode compartment an anolyte solution which contains an alkali salt of hydroxide complex anion {e.g., of the formula $[M(OH)_n]^{-p}$ as defined above}, said solution being supplied from the electrolyte reservoir of a metal/air battery;
recirculating through said cathode compartment a catholyte solution which contains alkali hydroxide, whereby the concentration of said catholyte solution increases gradually;
optionally separating solids which precipitate in the anolyte solution (for example, separating the solids from an outgoing anolyte stream drawn from said anode compartment and returning an essentially clear, solid free anolyte stream back to the anode compartment); and
adding the concentrated alkali hydroxide solution from the catholyte to an electrolyte of a metal/air battery.

The invention also relates to an electrolyte regeneration device comprising membrane electrolysis cell having spaced-apart anode and oxygen-consuming cathode, with cation exchange membrane placed in the space between said anode and cathode defining an anode compartment and cathode compartment.

In one embodiment, the anode compartment and the cathode compartment are connected to allow passage of oxygen from the anode side to the outer face of said cathode.

In one embodiment, a first tank which contains an alkali salt of hydroxide complex anion is connected to the anolyte circulation line and a second tank which contains alkali hydroxide is connected to the catholyte circulation line.

In one embodiment, the anode compartment and the cathode compartment are connected to anolyte and catholyte circulation lines, respectively, with solid/liquid separation means placed in or in fluid communication with the anolyte circulation line.

For example, the electrolyte regeneration device of the invention may be placed in electric vehicle battery maintenance centers providing service to electric vehicles powered by metal/air batteries with alkaline electrolyte. On arrival to the maintenance center, at least a portion of spent alkaline electrolyte may be drained of from the electric vehicle and subjected to regeneration by means of the apparatus of the invention.

Thus, in another aspect, the invention provides a method for regenerating, in an electric vehicle service station, an electrolyte of a metal/air battery of an electric vehicle arriving at said service station, which method comprises removing spent electrolyte from a reservoir connected to said metal/air battery mounted in said vehicle, regenerating the electrolyte and feeding a regenerated electrolyte or a fresh electrolyte to the reservoir. The regeneration is accomplished by means of the electrolysis-based method described above.

In one embodiment, the regeneration method comprises:
providing a membrane electrolysis cell comprising:
an anode;
an oxygen-consuming cathode;
a cation exchange membrane placed in the space between said anode and said cathode, said membrane defining an anode compartment and cathode compartment.
filling the spent electrolyte into said anode compartment to form an anolyte solution;
filling alkaline solution into said cathode compartment to form a catholyte solution;
passing an electric current through the membrane electrolysis cell thus reducing the concentration of alkali hydroxide in the anolyte solution and increasing the concentration of alkali hydroxide in the catholyte solution.

Figure 5:
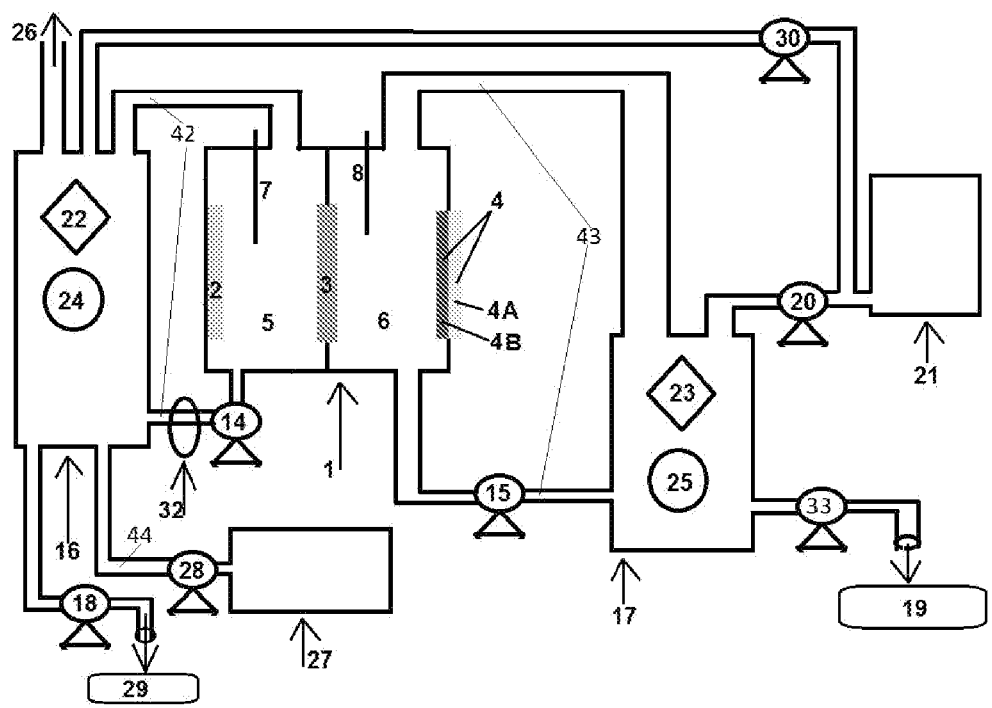
FIG. 5 is a schematic of an electrolysis cell of the invention.

FIG. 5 is a schematic illustration of an apparatus which can be placed in electric vehicle battery maintenance center. The apparatus contains, in addition to the membrane electrolysis cell (1) and the cell components (2)-(8) as described above, also anolyte and catholyte circulation paths (42, 43) allowing the recirculation of anolyte and catholyte solutions held in tanks (16) and (17) through the anodic (5) and cathodic (6) sides, respectively, of the membrane electrolysis cell (1).

The spent electrolyte that is withdrawn from the metal/air battery (not shown) is held in storage tank (27). Storage tank (27) is connected to tank (16) by means of feed line (44), through which the spent electrolyte is allowed to flow to tank (16), driven by suitable means e.g., pump (28). The anolyte circulation path (42) is equipped with pump (14) or other driving means for feeding the anolyte held in tank (16) to the anodic compartment (5). The anolyte is discharged from the bottom of compartment (5) and is directed back to tank (16), through line (42) and solid/liquid separation means such as filter (32). It should be noted that due to the precipitation of the metal hydroxide $M(OH)_m$ (e.g., $Al(OH)_3$) in the anodic compartment, the anolyte removed from cell (1) consists of aqueous and solid phases and therefore line (42) which is used to deliver the anolyte from cell (1) back to tank (16) is preferably provided with solid/liquid separation means, e.g., a separator such as a filter (32) etc., for separating the solid $M(OH)_m$ (e.g. $Al(OH)_3$), such that an essentially clear solution may be returned to tank (16). An outlet opening at the bottom of tank (16) is used for discarding an anolyte stream through a conduit connected to a container (29). Optional pump (18) is turned on to allow the contents of tank (16) to be discarded once it is determined that either the potassium level is too low, the level of impurities detected exceeds a prefixed maximum level or solid content is determined to be too high for continuous circulation in the device. As already mentioned above, oxygen evolving on the anode may be either released to the atmosphere through optional gas outlet

(26) or may be channeled (e.g., following temporary storage) to the cathode by means of a suitable feeding system (not shown).

Tank (16) may be provided with a cooling/heating means for adjusting the temperature of the anolyte solution. For example, the cooling/heating (22) means may be activated in response to temperature signals generated by thermocouple (7) immersed in the anode compartment (5). Various properties of the anolyte solution held in tank (16), such as conductivity, pH or viscosity, may be continuously or periodically measured by suitable instruments such as pH-meter etc. (collectively indicated by numeral 24), and process variables, e.g. rate of flow the spent electrolyte driven by pump (28), discharge of anolyte tank by pump (18) and dilution of the circulating solution with water may be adjusted in response to said measurements.

Turning now to the catholyte circulation path (43), the incoming and outgoing catholyte streams which enter and exit the cathode compartment (6), respectively, are driven by pump (15), with the catholyte solution being held in tank (17). The concentration of the alkali hydroxide solution in tank (17) increases with the passage of time, and on reaching a predetermined concentration, e.g., of not less than 5% and preferably from 10-40 wt %, for example 20-30 wt %, valve/pump (33) is opened to allow the flow of the concentrated alkali solution to a storage tank (19), e.g. by gravity or by driving means, from which it may be supplied to the reservoir of metal/air battery mounted in electric vehicle (not shown). Elements (23) and (25) fulfill similar functions as elements (22) and (24), respectively.

Water is supplied from water storage tank (21) to tanks (16) and/or (17) through two separate feed lines controlled by valves & pumps (20, 30), respectively. For example, having transferred a desired volume of a concentrated alkali hydroxide solution from tank (17) to tank (19), valve (33) is closed and pump& valve (20) is opened to allow dilution of the alkali solution left at tank (17) by means of fresh water held in storage tank (21), to form in tank (17) a dilute alkali hydroxide solution suitable for use as a starting catholyte solution for the electrolysis according to the invention.

As mentioned above, the apparatus shown in FIG. 5 may be placed in electric vehicle battery maintenance center for carrying out off-board regeneration of the electrolyte of a metal/air battery. On arrival of the electric vehicle, the electrolyte is discharged from the metal/air battery mounted in the vehicle into tank (27) (or directly into tank (16)). Regenerated electrolyte collected in storage tank (19) is fed to the reservoir coupled to the battery in the vehicle.

However, another variant of the invention incorporates the device of the invention into metal/air battery system for powering electric vehicles, thus allowing onboard electrolyte regeneration. This variant of the invention is therefore an electrochemical energy generation apparatus comprising:

metal/air battery provided with a reservoir for circulating electrolyte;
an electrolyte regeneration device comprising membrane electrolysis cell having spaced apart anode and oxygen-consuming cathode, with cation exchange membrane placed in the space between said anode and cathode defining an anode compartment and cathode compartment which are connected to anolyte and catholyte circulation lines, respectively;
wherein the anolyte circulation is optionally provided with solid/liquid separation means, and wherein at least one of the compartments of the membrane electrolysis cell is in fluid communication with the electrolyte reservoir of said metal/air battery.

Figure 6:
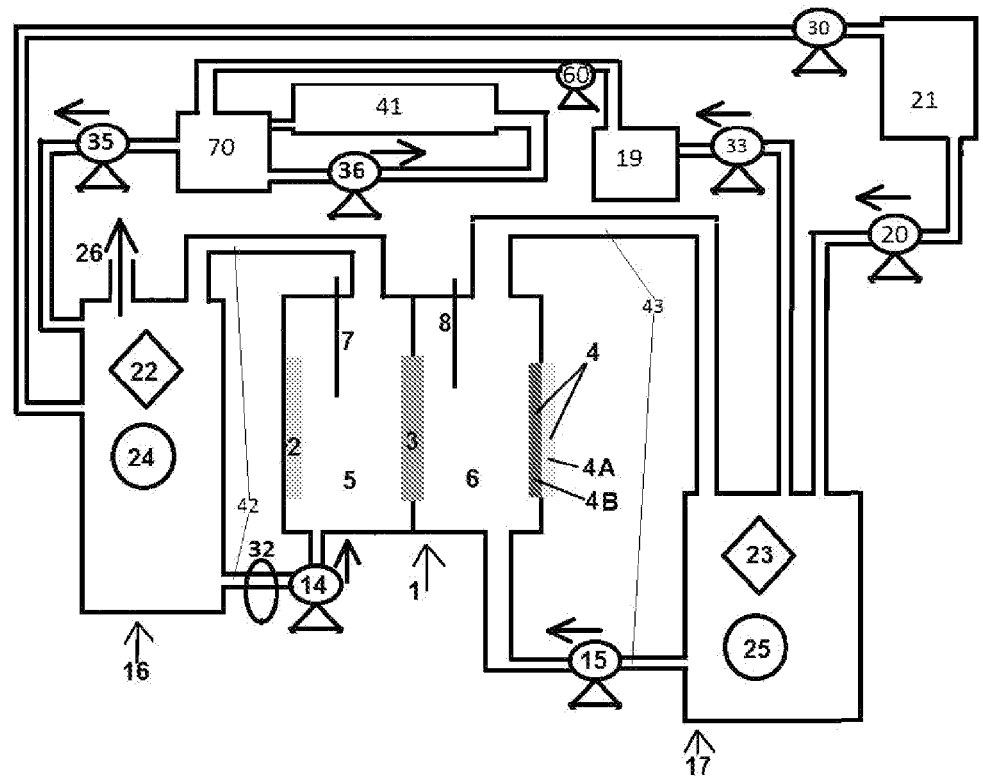
FIG. 6 is a schematic of an electrolysis cell of the invention.

FIG. 6 illustrates an electrical power generation device comprising metal/air battery (41) coupled to an electrolyte regeneration device that is based on the membrane electrolysis cell set out in the foregoing description. The metal/air battery and its electrolyte reservoir are indicated by numerals (41) and (70), respectively. Numeral (41) indicates a cell stack having configuration well known in the art (e.g., see U.S. Pat. No. 4,908,281). The recirculation path of the electrolyte is also shown, with pump (36) driving the electrolyte from reservoir (70) through the cell stack and back to the reservoir.

The spent electrolyte is allowed to flow from electrolyte reservoir (70) through a conduit or pump (35) to anolyte tank (16). The operation of the apparatus shown in FIG. 6 is similar to the operation of the apparatus of FIG. 5. Regenerated alkali hydroxide solution produced and collected in tank (19) in accordance with the invention is directed to reservoir (70) via line or pipe using pump or other flow means (60).

The electrochemical energy generation apparatus shown in FIG. 6 may be incorporated within an electric vehicle. The operation of the electrolyte regeneration device is powered by electricity and thus the regeneration of the electrolyte of the metal/air battery can take place at any conveniently located rest stop, especially the vehicle owner's home.

Another aspect of the invention is an electric vehicle powered by metal/air battery (and optionally by means of other power sources, e.g., lithium batteries), which is characterized in that a reservoir holding the recirculating electrolyte of said metal/air battery is in fluid communication with an electrolyte regeneration device powered by electricity, especially the device described above which contains a membrane electrolysis cell.

Another aspect of this invention is a method for regenerating spent electrolyte solution, the method comprising:
providing a first and a second membrane electrolysis cells, each cell comprising:
an anode;
an oxygen-consuming cathode;
a cation exchange membrane placed in the space between said anode and said cathode, said membrane defining an anode compartment and cathode compartment.
filling said spent electrolyte into said anode compartment of said first cell to form a first anolyte solution;
filling alkaline solution into said cathode compartment of said first cell to form a first catholyte solution;
passing an electric current through the first membrane electrolysis cell thus reducing the concentration of alkali hydroxide in said first anolyte solution and increasing the concentration of alkali hydroxide in said first catholyte solution;
filling said first anolyte solution into said anode compartment of said second cell to form a second anolyte solution;
filling alkaline catholyte solution into said cathode compartment of said second cell to form a second catholyte solution;
passing an electric current through the second membrane electrolysis cell thus reducing the concentration of alkali hydroxide in the second anolyte solution and increasing the concentration of alkali hydroxide in the second catholyte solution.

In one embodiment, the alkaline solution comprises KOH or NaOH. In one embodiment, the KOH/NaOH concentration of the alkaline solution filled in the first cell prior to electrolysis 1 is higher than the KOH/NaOH concentration of the alkaline solution filled in the second cell prior to electrolysis 2.

In one embodiment, following the step of passing current through the first cell, the first catholyte solution is transferred to a regenerated electrolyte reservoir. In one embodiment, following the step of passing current through said second cell, the second catholyte solution is transferred to the cathode compartment of the first electrolysis cell. Accordingly, following the second electrolysis process in cell 2, the catholyte that is formed is transferred to the cathode compartment of electrolysis cell 1 and forms catholyte 1 solution. Accordingly, in the case where subsequent electrolysis 1 steps are performed, there is no need to prepare catholyte 1 solution, but rather it can always be taken from catholyte 2 at the end of each electrolysis 2 process.

In one embodiment, the method described above comprises the use of two electrolysis cells. This method comprises a two-step electrolysis process designed to enhance the efficiency of the separation of e.g. KOH from alkali aluminate solution carried out in the membrane electrolysis cell. During a single electrolysis process comprising one membrane cell, the concentration of KOH in the catholyte gradually increases and its concentration in the anolyte decreases. After some electrolysis time, the concentration gradient (high concentration in the catholyte and low concentration in the anolyte) reduces the efficiency of $K^+$ ion passage from the anolyte to the catholyte. In order to overcome this effect, a method comprising two membrane electrolysis cells is employed. According to this aspect and in one embodiment, the spent electrolyte from a battery is introduced as the anolyte solution to the anode compartment of electrolysis cell 1. The KOH concentration of the spent electrolyte is around 30% in one embodiment. As a catholyte, a KOH solution of approximately 15% is introduced. The electrolysis process is started by passing current through the cell. During electrolysis, $K^+$ ions are transferred from the anolyte to the catholyte through the cell membrane. After some electrolysis time, the KOH concentration in the anolyte reduces from approximately 30% to approximately 15%. At the same time, the KOH concentration in the catholyte increases from approximately 15% to approximately 30%. At this point, the catholyte solution can be used as a regenerated electrolyte and can be transferred to the battery. The anolyte (now of KOH concentration of approximately 15%) is transferred to the anode compartment of the second electrolysis cell forming the anolyte of the second cell. For the catholyte of the second cell, a solution comprising KOH with a concentration of a few percent (e.g. 2%-3% KOH or 3%-5% KOH) is introduced. This lower KOH concentration enhances the efficiency of $K^+$ ion passage from the anolyte to the catholyte during electrolysis. Electrolysis is then started on this second cell by passing current through the cell. As a result of the current supplied, $K^+$ ions are transferred from the anode compartment to the cathode compartment through the membrane. Accordingly, KOH concentration in the catholyte increases (e.g. from 1-5% to approximately 15%) while KOH concentration in the catholyte decreases (e.g. from 15% to approximately 1-5%). This step of the process allows the extraction of more KOH from the spent electrolyte solution. The anolyte solution resulting from this second cell electrolysis can be discarded. The catholyte solution resulting from this second cell electrolysis is transferred to the cathode compartment of electrolysis cell 1, as it now has a the desired KOH concentration (~15%) for an electrolysis 1 process. The two electrolysis processes in the two electrolysis cells can be carried out serially or in parallel and for various time periods. After the completion of each electrolysis 1 process, the KOH concentrated catholyte 1 solution which now contain regenerated electrolyte is transferred to the battery, or to the electrolyte reservoir which is part of the battery or to any other electrolyte reservoir. The catholyte used for the second electrolysis process (electrolysis 2) can be made from KOH and water in one embodiment. In another embodiment, the catholyte used as catholyte 2 can be the washing water of solids/wetted solids comprising KOH.

In one embodiment, features that apply to the one electrolysis cell system may apply to the two-cell system as well.

In one embodiment, a two-step electrolysis process is conducted in one electrolysis cell. According to this aspect and in one embodiment, spent electrolyte is introduced as the anolyte solution of the cell. An alkali hydroxide solution is placed in the catholyte cell. A first electrolysis step is performed by passing current through the cell. Electrolysis causes the increase of the alkali hydroxide concentration in the catholyte. During this first electrolysis step, the alkali hydroxide concentration in the anolyte decreases. Following this first electrolysis step, the catholyte from the cell is removed and a new catholyte solution is introduced into the cathode compartment. The anolyte solution resulted from the first electrolysis step remains in the anode compartment.

A second electrolysis step is performed by passing current through the cell. Electrolysis causes the increase of the alkali hydroxide concentration in the catholyte. During this second electrolysis step, the alkali hydroxide concentration in the anolyte further decreases. In one embodiment, following this second electrolysis step, the catholyte from the cell is removed and a new catholyte solution is introduced into the cathode compartment. The anolyte solution resulted from the second electrolysis step may be discarded.

In another embodiment the electrolysis process is implemented in the continuously operated "train" of numerous electrolysis cells, interconnected in way, allowing the counter-current flow of liquid through anodic parts of the cells in train (anolyte flow), and through cathodic parts of the cells in train (catholyte flow). To provide such an organization of anolyte and catholyte, the outlet of the anodic compartment of cell number one in the train is connected to the inlet of the anodic compartment of the cell number two, and so on; while the outlet of the cathodic compartment of the last cell in the train is connected to the inlet of the cathodic compartment of the cell before last, and so on. The spent electrolyte is fed into the inlet of the anodic compartment of the cell number one, and low-concentration alkaline solution is fed into the inlet of the cathodic compartment of the last cell. The regenerated electrolyte is discharged from the outlet of the cathodic compartment of the cell number one, and the low concentration alkali solution, containing aluminum compounds, is discharged from the outlet of the last cell.

In one embodiment this invention provides a device for regenerating spent electrolyte solution, the device comprising:
 a first and a second membrane electrolysis cells, each cell comprising:
  an anode;
  an oxygen-consuming cathode;
  a cation exchange membrane placed in the space between said anode and said cathode, the membrane defining an anode compartment and cathode compartment;

wherein, spent electrolyte is filled into the anode compartment of the first cell to form a first anolyte solution and alkaline solution is filled into the cathode compartment of the first cell to form a first catholyte solution; and wherein the anode compartment of the second cell is connected to the anode compartment of the first cell such that anolyte from the first cell is transferred to the anode compartment of the second cell following electrolysis in the first cell; and wherein catholyte solution comprising KOH is filled into the cathode compartment of the second cell to form a second catholyte solution.

In one embodiment, this invention provides electrolyte regeneration device comprising a first and a second membrane electrolysis cells, each cell comprising an anode and an oxygen-consuming cathode, with cation exchange membrane placed in the space between the anode and the cathode defining an anode compartment and cathode compartment, wherein the anode compartments of the two cells are connected and the cathode compartments of the two cells are connected.

In one embodiment, at least one of the anode compartments and cathode compartments are connected to anolyte and/or catholyte circulation lines, respectively, with solid/liquid separation means placed in, or in fluid communication with, said anolyte circulation line.

In one embodiment, the device further comprises a regenerated electrolyte reservoir. In one embodiment, during the operation of the device for regenerating the electrolyte (electrolyte regeneration device) current is passed through the first cell. Following current passage through the first cell, the first catholyte solution is transferred to the regenerated electrolyte reservoir. In one embodiment, following a step of passing current through the second cell, the second catholyte solution is transferred to the first cathode compartment of the first electrolysis cell. Accordingly, following the second electrolysis process in cell 2, the catholyte that is formed is transferred to the cathode compartment of electrolysis cell 1 and forms catholyte 1 solution. Accordingly, in the case where subsequent electrolysis steps are performed in cell 1, there is no need to prepare catholyte 1 solution, but rather it can always be taken from catholyte 2 at the end of each electrolysis 2 process.

In one embodiment, the device comprises conduits connecting the first and the second anode compartments. In one embodiment, the device comprises conduits connecting the first and the second cathode compartments. In one embodiment, the device comprises conduits connecting the first cathode compartment to a regenerated electrolyte reservoir. In one embodiment, the device comprises conduits connecting the first cathode compartment to an electrolyte reservoir of a metal-air battery. In one embodiment, the device comprising conduits connecting the first and/or the second cathode compartments to an alkaline solution reservoir. In one embodiment, the device comprising conduits connecting the second anode compartment to a waste container. In one embodiment, the device comprising conduits connecting the first anode compartment to an electrolyte reservoir of a metal-air battery. In one embodiment, pumps are used in order to transfer solutions between the various containers/reservoirs of the device. In one embodiment, filters or other separation means are used to separate or filter solids from solutions used in devices of the invention.

In one embodiment, the device described above comprises two electrolysis cells. This device enables a two-step electrolysis process designed to enhance the efficiency of the separation between KOH and $AlOH_3$ carried out in the membrane electrolysis cell.

In one embodiment, more than two electrolysis cells are employed in systems of the invention. According to this aspect and in one embodiment, the KOH concentration in the anolyte and/or in the catholyte for each electrolysis cell is different from the KOH concentration in other cells, thus increasing the efficiency of KOH regeneration in the catholyte of each cell. In one embodiment, electrolyte regeneration systems of the invention comprise 3 or 4 or 5 or 6-10 electrolysis cells. According to this aspect and in one embodiment, a system comprising three electrolysis cells is employed. The starting KOH concentration in the catholyte has a high value in the first cell, an intermediate value in the second cell and a low value in the third cell. The spent electrolyte with high KOH concentration is introduced to the anode compartment of the first electrolysis cell to form anolyte 1. Electrolysis is conducted and the anolyte (now lower on KOH) is transferred to the second cell for the second electrolysis process against the second catholyte solution. Following the second electrolysis process, the anolyte is transferred to the third cell for a third electrolysis process against the third catholyte solution. Such cascade process can be extended to a larger number of electrolysis cells, e.g. 4-5. Such cascade process involving more than one cell increase the efficiency of electrolyte regeneration in one embodiment, as the passage of $K^+$ ions through the membrane is facilitated as a result of a more suitable concentration gradient between the anolyte and the catholyte compartments.

In one embodiment, the processes of electrolysis 1, electrolysis 2 or a combination thereof were conducted for about 10 h or for about 15 h or for about 20 h. In one embodiment, electrolysis process time was ranging between 1 h and 20 h, between 5 h and 15 h, between 1 h and 50 h, between 1 h and 100 h, between 0.1 h and 100 h, between 1 minute and 5 h, between 10 h and 30 h, between 1 minute and 1 h, between 2 h and 25 h, between 10 h and 75 h. In one embodiment, electrolysis process time is the time duration in which current was passed through the membrane electrolysis cells, or the time when current was applied to the cells, current was forced through the cells. In one embodiment, the current passed to the cell is an electrical current and the process within the cell is an electrochemical process wherein chemical species undergoes oxidation/reduction reactions, thus enabling electrical current conduction.

In one embodiment, the processes of electrolysis 1, electrolysis 2 or a combination thereof were conducted at room temperature. In one embodiment, the processes were conducted at an elevated temperature or at a temperature lower than room temperature. In one embodiment the processes were initially conducted at room temperature, but during electrolysis, the temperature was elevated due to self-heating (e.g. heating of the cell and/or the solutions as a result of current passage/chemical and electrochemical reactions etc.). In one embodiment, electrolysis started at room temperature and during the process, the temperature was elevated to 32° C. In one embodiment, electrolysis is started at room temperature and is elevated to a temperature range of 30° C.-40° C., to 25° C.-55° C., to 20° C.-30° C., to 25° C.-65° C., to 25° C.-80° C. In one embodiment, the electrolysis process was started at a temperature range of 5° C.-10° C., 10° C.-20° C., 15° C.-25° C., 20° C.-30° C., 30° C.-40° C., 40° C.-50° C., 50° C.-60° C., 10° C.-80° C., 60° C.-80° C., 80° C.-100° C. In one embodiment, electrolysis is temperature controlled and the temperature is kept within a desired range. According to this aspect and in one embodiment, cooling/heating devices are used to maintain the desired temperature. Temperature control is achieved by any method known in the art, e.g. by air venting or by running cooling water around the electrolysis cell.

In one embodiment, the processes of electrolysis 1, electrolysis 2 or a combination thereof were conducted at a current density of 100 mA/cm$^2$. In one embodiment, the processes were conducted at a current density of 50 mA/cm$^2$. In one embodiment, current density ranges in electrolysis processes of the invention were 10 mA/cm$^2$-50 mA/cm$^2$, 50 mA/cm$^2$-100 mA/cm$^2$, 10 mA/cm$^2$-500 mA/cm$^2$, 25 mA/cm$^2$-75 mA/cm$^2$, 50 mA/cm$^2$-250 mA/cm$^2$, 50 mA/cm$^2$-150 mA/cm$^2$, 150-300 mA/cm$^2$, 300-400 mA/cm$^2$, 400-600 mA/cm$^2$ In one embodiment, the current density can be of any value that fits other experimental parameters and can be any value that yields the desired electrolysis results.

In one embodiment, the volume of the catholyte, the anolyte or of a combination thereof used for the electrolysis process is 100 cc, 110 cc or 120 cc. In one embodiment, the volume of the catholyte, the anolyte or of a combination thereof used for the electrolysis process ranges between 100 cc and 110 cc, between 100 cc and 120 cc, between 100 cc and 200 cc, between 50 cc and 150 cc, between 20 cc and 200 cc, between 75 cc and 125 cc, between 10 cc and 100 cc, between 100 cc and 1000 cc, between 100 cc and 500 cc, between 500 cc and 1000 cc. In one embodiment, spent electrolyte from one metal-air battery is used for the electrolysis process. One or more batches of spent electrolyte from a battery may be used for the electrolysis process. In one embodiment, spent electrolyte from more than one metal-air battery is used for the electrolysis regeneration process. Batches of spent electrolyte from one or more batteries may be accumulated in a reservoir and undergo the electrolysis process at a certain time and with a certain spent electrolyte volume as needed. In one embodiment, the volume of the catholyte, the anolyte or of a combination thereof used for the electrolysis process can be any volume as needed. In one embodiment, the mass of the solutions used for the electrolysis process can be in the range of grams, kilograms or tons. Any range of solution mass or of solution volume used for the catholyte, for the anolyte or for a combination thereof is applicable to processes of this invention.

In one embodiment, the initial KOH anolyte concentration prior to electrolysis is about 30% and following the electrolysis process is reduced to a final concentration of about 15%. In one embodiment, the initial anolyte concentration (prior to electrolysis) and the final anolyte concentration (following electrolysis) are at the ranges of 25%-30% (initial) and 15%-20% (final), 25%-30% (initial) and 10%-20% (final), 25%-35% (initial) and 10%-20% (final), 25%-45% (initial) and 10%-25% (final), 20%-40% (initial) and 5%-20% (final), 15%-20% (initial) and 5%-10% (final), 15%-50% (initial) and 5%-25% (final), 15%-25% (initial) and 5%-15% (final), 10%-50% (initial) and 1%-30% (final), 10%-20% (initial) and 1%-5% (final), 5%-15% (initial) and 1%-50% (final).

In one embodiment, for the two-cell electrolysis systems and methods, the initial concentration of KOH in catholyte 1 is higher than the initial concentration of KOH in catholyte 2. In one embodiment, for the two-cell electrolysis systems and methods, the initial concentration of KOH in anolyte 1 is higher than the initial concentration of KOH in anolyte 2.

In one embodiment, for the two-cell electrolysis systems and methods, the final concentration of KOH in catholyte 1 is higher than the final concentration of KOH in catholyte 2. In one embodiment, for the two-cell electrolysis systems and methods, the final concentration of KOH in anolyte 1 is higher than the final concentration of KOH in anolyte 2.

In one embodiment, for the two-cell electrolysis systems and methods, the final concentration of KOH in catholyte 1 is higher than the initial concentration of KOH in catholyte 1. In one embodiment, for the two-cell electrolysis systems and methods, the final concentration of KOH in anolyte 1 is lower than the initial concentration of KOH in anolyte 1.

In one embodiment, for the two-cell electrolysis systems and methods, the final concentration of KOH in catholyte 2 is higher than the initial concentration of KOH in catholyte 2. In one embodiment, for the two-cell electrolysis systems and methods, the final concentration of KOH in anolyte 2 is lower than the initial concentration of KOH in anolyte 2.

In one embodiment, "initial concentration" means the concentration of the solution prior to electrolysis and "final concentration" means the concentration of the solution following electrolysis.

In one embodiment, the initial KOH catholyte concentration prior to electrolysis is about 15% and following the electrolysis process is increased to a final concentration of about 30%. In one embodiment, the initial catholyte concentration (prior to electrolysis) and the final catholyte concentration (following electrolysis) are at the ranges of 15%-20% (initial) and 25%-30% (final), 10%-20% (initial) and 25%-30% (final), 10%-20% (initial) and 25%-35% (final), 10%-25% (initial) and 25%-45% (final), 5%-20% (initial) and 20%-40% (final), 5%-10% (initial) and 15%-20% (final), 5%-25% (initial) and 15%-50% (final), 5%-15% (initial) and 15%-25% (final), 1%-30% (initial) and 10%-50% (final), 1%-5% (initial) and 10%-20% (final), 1%-50% (initial) and 5%-15% (final). Other KOH concentration ranges are possible by introducing initial anolyte and catholyte solutions with desired concentrations and by adjusting electrolysis parameters. In one embodiment, concentration percent is weight percent.

DEFINITIONS

"On-board" means that the unit or system referred to is placed or located or mounted "on" or "in" or "within" or "on top" or in contact with the metal air battery (e.g. on the electric vehicle).

Off-board means that the unit or system referred to is placed or located at a place outside or at a distance from the metal-air battery. Off-board means not "on" or not "in" or not "within" or not "on top" or not in contact with the metal-air battery (e.g. not carried on the electric vehicle). In one embodiment, off-board location is a gas station, a service station, a road-side station, a garage, a parking lot, a home, a yard, a warehouse, an auto-care center etc.

Alkaline or alkaline solution is a basic solution Alkaline solution is a solution with a pH value greater than 7.0. An alkaline solution is a solution comprising a base. An example of alkaline solution is a solution of KOH or NaOH dissolved in water. In some embodiments, caustic solutions are highly basic solutions or concentrated alkaline solutions. In some embodiments alkaline solution is a solution comprising an alkali metal ion.

In one embodiment, methods of this invention comprise the step of "generating a concentrated alkali hydroxide solution in a catholyte solution". In one embodiment, the term "concentrated alkali hydroxide solution" refers to an alkaline solution (e.g. KOH or NaOH aqueous solutions) concentrated to the level that suits the use of the solution as an electrolyte in a metal-air battery. In one embodiment, the term "concentrated alkali hydroxide solution" refers to an alkaline solution (e.g. KOH or NaOH solutions) that is more concentrated after the electrolysis process relative to its concentration before the electrolysis process. According to this aspect and in one embodiment, "concentrated" means having a higher concentration as compared to the solution before electrolysis treatment. Concentrated solution may acquire any value e.g. from 1% to 50% KOH or NaOH (weight percent). Concentrated solution is a solution of 20%-40% KOH or NaOH in one embodiment.

In embodiments of the invention KOH may be replaced by NaOH. Accordingly, embodiments of the invention wherein KOH is cited are applicable to the use of NaOH instead of KOH or in a combination with KOH.

In one embodiment, "aluminate KOH" refers to KOH incorporated with $Al(OH)_3$ to form $K^+[Al(OH)_4]^-$, also represented by $K[Al(OH)_4]$. Aluminate KOH is a result of the following reaction:

$$KOH + Al(OH)_3 \rightarrow K[Al(OH)_4] \text{ also described by:}$$

$$KOH + Al(OH)_3 \rightarrow K^+[Al(OH)_4]^-$$

A "regenerated electrolyte reservoir" is a reservoir that holds the regenerated electrolyte. The regenerated electrolyte reservoir can be connected to the metal-air battery. The regenerated electrolyte reservoir can be located in or on an electric vehicle or it can be placed in a service station or in any other location.

An electrolyte regeneration device is a device or a system that is used for electrolyte regeneration. In one embodiment, an electrolyte regeneration device or system is used to prepare regenerated electrolyte that can be subsequently used from spent electrolyte that can no longer be used. In one embodiment, an electrolyte regeneration device or system is used for electrolyte recycling.

"Ah/cc value" is the electrolyte utilization value, which is obtained by division of total amount electricity produced by the battery, by the starting volume of fresh electrolyte. For example, if the battery is started with 5 L of fresh electrolyte, and produce 1000 Ah of electricity, the electrolyte utilization would be:

1000 Ah/5000 cc=0.2 Ah/cc

Electrolyte utilization is roughly proportional to the amount of the aluminum dissolved in the electrolyte. Utilization of 0.2 Ah/cc means approximately 75-85 g/L of dissolved aluminum.

Passing an electric current through the membrane electrolysis cell means performing electrolysis using the electrolysis cell. For example, passing current through the first membrane electrolysis cell means performing "electrolysis 1". Passing an electric current through the membrane electrolysis cell means performing electrolysis of one or more chemicals present near the cathode and/or near the anode of the electrolysis cell.

In one embodiment, a reservoir is a container for holding liquids, solutions, solids, suspensions, gases or a combination thereof. In one embodiment, a reservoir comprises a container, a tank, a vessel or a bottle.

In one embodiment, a connection comprises a conduit, a hose, a tube, a pipe or a channel. In one embodiment, connections in devices of the invention can assume an "open" and a "close" positions such that the connection can be either open or closed as needed.

In one embodiment, this invention provides an electrolyte regeneration device powered by electricity. "Powered by electricity" means that the electrolyte regeneration device is used for performing an electrolysis process. The electrolysis process is powered or enabled by electricity. The electrolysis process is conducted by passing current through the electrolysis cell of the electrolyte regeneration device or system.

In one embodiment, this invention provides a system for electrolyte regeneration, the system comprises an electrolyte regeneration device of the invention.

In one embodiment, the term "a" or "one" or "an" refers to at least one. In one embodiment the phrase "two or more" may be of any denomination, which will suit a particular purpose. In one embodiment, "about" or "around" or "approximately" may comprise a deviance from the indicated term of +1%, or in some embodiments, −1%, or in some embodiments, ±2.5%, or in some embodiments, ±5%, or in some embodiments, ±7.5%, or in some embodiments, ±10%, or in some embodiments, ±15%, or in some embodiments, ±20%, or in some embodiments, ±25%.

The following examples are presented in order to more fully illustrate the preferred embodiments of the invention. They should in no way be construed, however, as limiting the broad scope of the invention.

EXAMPLES

Example 1

Electrolysis of Spent Electrolyte-Materials and Methods

The experimental set-up used in the following examples consists of a cell as shown in FIG. 3, with nickel (Ni) plate serving as an anode (2) and an air electrode based on silver catalyst, as described below, serving as the cathode (4). A commercially available membrane type Neosepta CMX was used as the cation permeable membrane (3). The active area of the membrane was 9.6 square centimeter. The active area of the cathode was also 9.6 square centimeter. The anode electrode area was 24 square centimeter. The dimensions of the anodic and cathodic compartments were approximately 6*3*8 $cm^3$. The electrodes were connected to the opposite poles of DC power source (i.e., the positive pole to the anolyte compartment and the negative pole to the catholyte compartment). Current densities are calculated based on cathode area.

The source of the $K[Al(OH)_4]$ samples employed as anolyte solutions in the set of experiments described below was a spent electrolyte removed from an aluminum/air battery, after it has dropped to a level of 0.2 Ah/cc or 0.4 Ah/cc. In some of the experiments, samples of the spent electrolyte were used as is, while in other cases the samples were treated to recover clear aqueous fractions. To this end, the sample was centrifuged at 3500 rpm for 20 minutes, following which the clear supernatant was used as anolyte solution in the test.

Preparation of Air Cathode for Use in the Membrane Electrolysis Cell

Printable Catalyst Composition: silver catalyst (70 grams; prepared as described in U.S. Pat. No. 8,142,938) is mixed with 10 grams of FEP (available from Dupont in the form of aqueous dispersion, TE-9568). The mixture is placed in a rotating shaker for 1 hour. Water (20 grams) and isopropanol (20 grams) are then added to the mixture and the shaker is allowed to rotate for an additional period of 25 minutes. The resultant composition is allowed to stand for 1 hr and is then remixed for 25 minutes. The resultant composition exhibits good flow ability and thixotropicity and is suitable for use as a printable material.

Preparation of a Current Collector

Nickel mesh (commercially available from Gerard Daniel Worldwide (0.007 thickness nickel wire, plain weave 200 mesh) is cut with a guillotine knife to form a square shape with 16.5 cm*16.5 cm dimensions. The resultant mesh is thoroughly cleaned with ethanol and metallic particles are blown off from the mesh using air pressure. The mesh is cut to provide circles with an area of ~10 cm². A nickel ring with corresponding diameter is attached to the mesh to provide the current collector.

Preparation of the Electrode the catalyst formulation is applied on the current collector as follows. A 200-300 μm thick polypropylene sheet, the current collector and a ~500 μm stainless steel stencil are placed on a printing machine (Ami Presco model MSP-9155) one on top of the other, such that the polypropylene sheet and the stainless steel stencil constitute the lowermost and uppermost layers, respectively. The catalyst formulation is then applied using a blade or squeegee which is passed above the stencil such that the silver catalyst formulation penetrates through the stencil into the pores of current collector mesh. The stainless steel stencil is then removed, and 10 sheets of standard A4 paper are placed above the current collector and the stack is transferred to a press in which a 10 ton pressure is applied. The papers are carefully peeled off the electrode and the electrode is then detached gently from the polypropylene sheet.

Electrode Assembly the electrode and an hydrophobic film are combined as follows. A porous hydrophobic PTFE film (manufactured by Saint Gobain or Gore) which is slightly larger than the electrode is placed above the electrode and a pressure of 10 tons is applied using a press. The electrode assembly is then oven-sintered at about 280° C. for a period of about 20 minutes.

Example 2

Recovering Potassium Hydroxide from Aqueous Solution of K[Al(OH)$_4$]

K[Al(OH)$_4$] solution (115 cc, 0.2 Ah/cc) was introduced into the anode compartment of a membrane electrolysis cell. The solution used was the clear supernatant obtained as described above in example 1. Potassium hydroxide solution at a concentration of 10.4% w/w (110 cc) was introduced into the cathode compartment.

Current was applied between the electrodes, and the experiment was run for 21.6 hours. A constant current density of 100 mA/cm² was applied throughout most of the experiment, with the exception of the time interval between 4.6 h to 6.02 h, during which the current density was reduced to 50 mA/cm². The current flow capacity was 19.9 Ah and the energy put into the cell was 61.6 Wh. The experiment was allowed to run without any temperature control, and during the passage of the current through the cell, the temperature was around 31° C. due to self-heating.

No indication for hydrogen evolution was observed at the cathode throughout the experiment. The concentration of the potassium hydroxide solution increased from 10.4% w/w to 27.0% w/w in the catholyte compartment. The volume of the KOH catholyte was increased by about 20 cc. In the anode side, aluminum hydroxide precipitated and the volume of the anolyte was reduced by about 20 cc.

The experiment was repeated, but this time a larger volume of the same clear K[Al(OH)$_4$] solution (120 cc) was introduced into the anode side. Potassium hydroxide solution (10.4% w/w; 110 cc) was introduced into the cathode compartment. Current was applied between the electrodes; at the first hour, a current density of 50 mA/cm² was applied; it was then raised to 100 mA/cm² and kept at that value for the rest of the experiment, which was run for 18.9 hours. The current flow capacity was 17.56 Ah and the energy put into the cell was 47.75 Wh. The experiment was allowed to run without any temperature control, and during passage of current through the cell, the temperature was around 31° C. due to self-heating.

No indication for hydrogen evolution was observed at the cathode throughout the repeated experiment. The concentration of the KOH solution increased from 10.4% w/w to 25.9% w/w in the catholyte compartment. The volume of the catholyte was increased by about 20 cc. In the anode side, aluminum hydroxide precipitated and the volume of the anolyte was reduced by about 10 cc.

Figure 7:
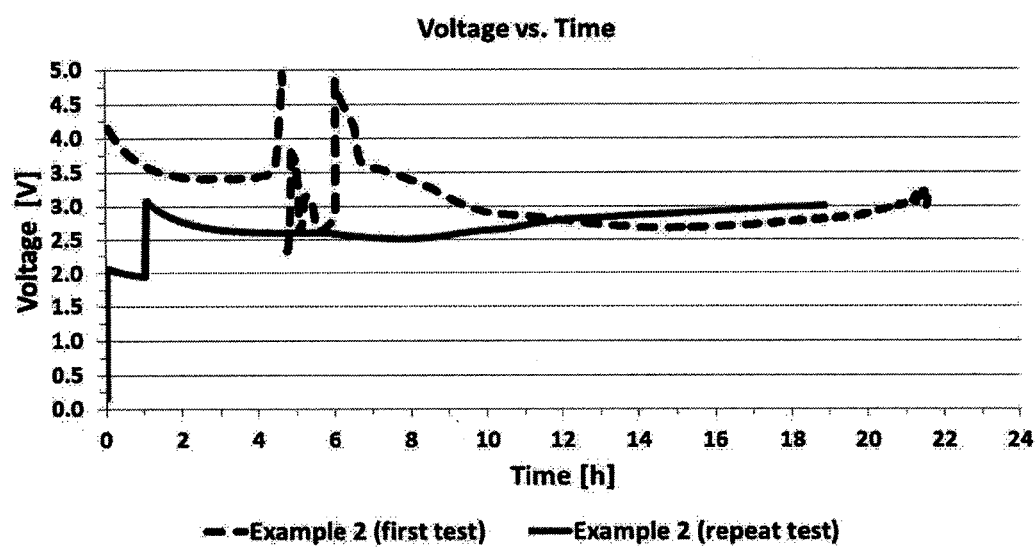
FIG. 7 is a plot of voltage vs. time for an electrolysis cell during operation.

FIG. 7 depicts voltage vs. time curves recorded for the two foregoing experiments (the results are indicated by a darker dashed line and by a light solid gray line, respectively).

Example 3

Recovering Potassium Hydroxide from Aqueous Solution of K[Al(OH)$_4$]

K[Al(OH)$_4$] solution (100 cc, 0.2 Ah/cc) was introduced into the anode compartment of a membrane electrolysis cell. The K[Al(OH)$_4$] solution was a spent electrolyte removed from an aluminum/air battery and was used as is, with no treatment. Potassium hydroxide solution at a concentration of 10.4% w/w was (110 cc) was introduced to the cathode compartment.

Current was applied between the electrodes with current density of 100 mA/cm². The experiment was run for 18.5 hours. The current flow capacity was 17.71 Ah. The experiment was allowed to run without any temperature control, and during passage of current through the cell, the temperature was around 32° C. due to self-heating.

No indication for hydrogen evolution was observed at the cathode side. The concentration in the catholyte compartment of the KOH solution increased from 10.4% w/w to 24.0% w/w. The volume of the catholyte was increased by about 22 cc. In the anode side, aluminum hydroxide precipitated and the volume of the anolyte was reduced by about 45 cc on account of water passage and enhanced precipitation. The anolyte solution was dense and viscous.

The experiment was repeated, but this time a larger volume of the same K[Al(OH)$_4$] solution (110 cc) was introduced into the anode side. Potassium hydroxide solution (10.4% w/w; 120 cc) was introduced into the cathode compartment. Current was applied between the electrodes with current density of 100 mA/cm². The experiment was run for almost 23 hours. It should be noted that after 21.4 hours, the voltage measured was 5 volts and consequently the current density was reduced to 50 mA/cm² and was kept at said level until the end of the test. The current flow capacity was 20.72 Ah and the energy put into the cell was 56.58 Wh. The experiment was allowed to run without any temperature control, and during passage of current through the cell, the temperature was around 32° C. due to self-heating.

No indication for hydrogen evolution was observed at the cathode side. The concentration of the KOH solution collected in the cathode side increased from 10.4% w/w to 25.8% w/w. The volume of the catholyte was increased by about 15 cc. In the anode side, aluminum hydroxide precipitated and the volume of the anolyte was reduced by about 50 cc due to water passage towards the catholyte and precipitation. The anolyte solution was dense and viscous.

Example 4

Recovering Potassium Hydroxide from a Aqueous Solution of K[Al(OH)$_4$]

K[Al(OH)$_4$] solution (120 cc, 0.2 Ah/cc) was introduced into the anode compartment of a membrane electrolysis cell. The K[Al(OH)$_4$] solution was a spent electrolyte removed from aluminum/air battery and used as is, with no treatment. Potassium hydroxide solution at a concentration of 5.7% w/w (100 cc) was introduced to the cathode compartment.

Current was applied between the electrodes with current density of 100 mA/cm$^2$. The experiment was run for 16.7 hours. The current flow capacity was 16.01 Ah and the energy put into the device was 45.13 Wh. The experiment was allowed to run without any temperature control, and during passage of current through the cell, the temperature was around 32° C. due to self-heating.

No indication for hydrogen evolution was observed at the cathode side. The concentration of the KOH solution increased from 5.7% (w/w) to 23.4% (w/w). The volume of the catholyte was increased by about 19 cc. In the anode side, aluminum hydroxide precipitated and the volume of the anolyte was reduced by about 55 cc on account of water passage to the cathodic side and the precipitation. The anolyte was hence more dense and viscous.

Figure 8:
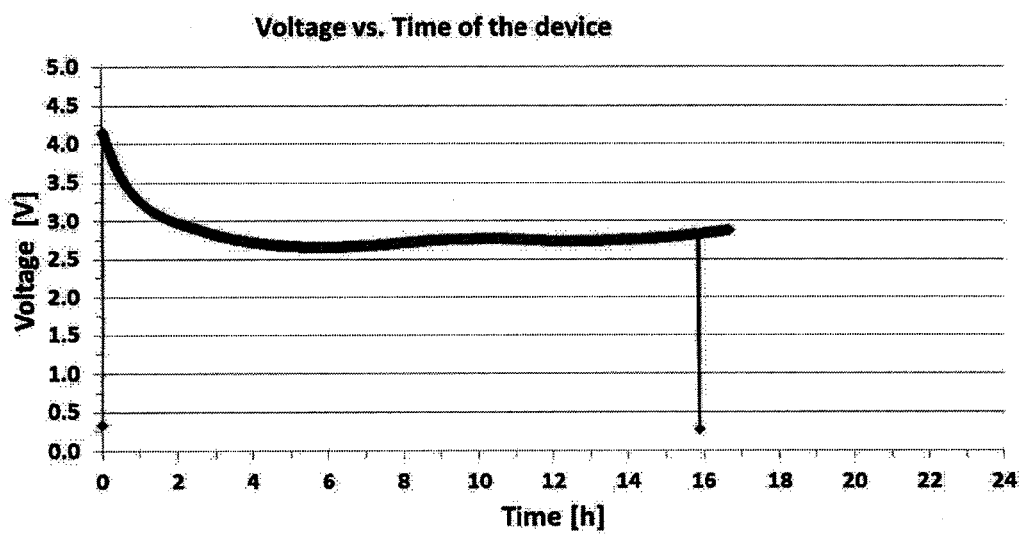
FIG. 8 is a plot of voltage vs. time for an electrolysis cell during operation.

FIG. 8 is voltage vs. time curve recorded for the experiment. It is noted that initially the voltage is higher due to the low concentration of the catholyte.

Example 5

Recovering Potassium Hydroxide from Aqueous Solution of K[Al(OH)$_4$]

The experiment reported in this example consists of two parts.

First Part of the Experiment:

120 cc of K[Al(OH)$_4$] 0.4 Ah/cc solution were introduced into the anode compartment of a membrane electrolysis cell. The K[Al(OH)$_4$] solution was a spent electrolyte removed from aluminum/air battery and used as is, with no treatment. 100 cc of 10.4% (w/w) potassium hydroxide solution were introduced to the cathode compartment.

Figure 9:
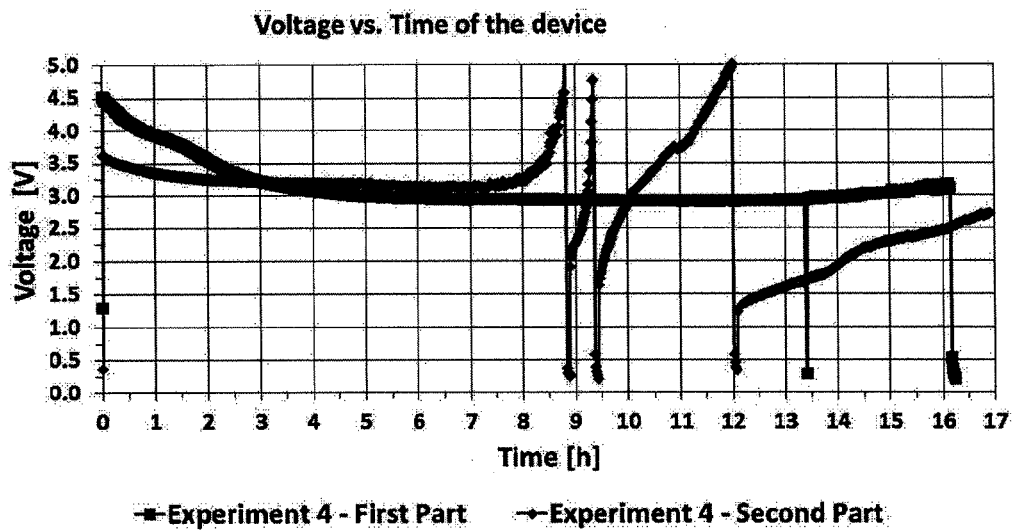
FIG. 9 is a plot of voltage vs. time for an electrolysis cell during operation.
Figure 10:
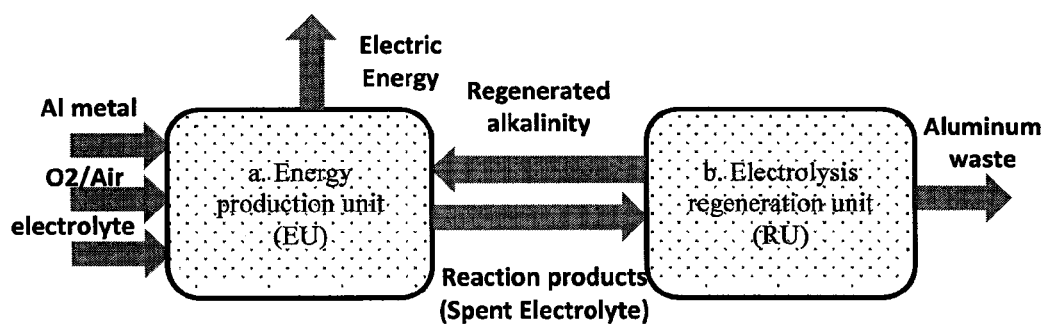
FIG. 10 is a schematic of system comprising an energy production unit and an electrolysis regeneration unit for electrolyte regeneration.

Current was applied between the electrodes with current density of 100 mA/cm$^2$ for a period of 16.7 hours. The current flow capacity was 15.48 Ah and the energy put into the device was 48.27 Wh. The test was allowed to run without any temperature control, and during the passage of current through the cell, the temperature was around 32° C. due to self-heating. FIG. 9 is voltage vs. time curve recorded for the experiment.

No indication for hydrogen evolution was observed at the cathode side. The concentration of the KOH solution increased from 10.4% (w/w) to 26.0% (w/w). The volume of the catholyte was increased by about 10 cc. In the anode side, aluminum hydroxide precipitated and the volume of the anolyte was reduced by about 40 cc on account of water passage to the cathodic side and the precipitation. The anolyte was hence more dense and viscous.

Second Part of the Experiment:

40 cc of K[Al(OH)$_4$] solution were added to the anolyte left from the first part of the experiment. The added volume of K[Al(OH)$_4$] solution was obtained from a spent electrolyte removed from aluminum/air battery and was used as is, with no treatment. The catholyte formed in the first part of the experiment was removed from the cell and a fresh potassium hydroxide solution (112 cc of 10.4% w/w KOH solution) was introduced into the cathodic side.

Current was applied between the electrodes for a total period of time of 16.9 hours. However, during the test period, the current was periodically reduced by half. Due to the use of highly viscous anolyte solution exhibiting progressively reducing conductivity, from time to time the voltage developed across the cell exceeded a preset value of 5 volts. Thus, whenever the voltage reached 5 volts, the current density was reduced by half. At the beginning of this part of the experiment, a current density of 100 mA/cm$^2$ was applied for a period of 8.8 h. Then, the current density was reduced to 50 mA/cm$^2$. About 30 minutes later, i.e., 9.3 h from the beginning of the test, the current density was dropped to 25 mA/cm$^2$. Later on, at 11.9 h, the current density was again lowered to 12 mA/cm$^2$.

The current flow capacity was 9.89 Ah and the energy put into the device was 31.65 Wh. The test was allowed to run without any temperature control, and during the passage of current through the cell, the temperature was around 31° C. due to self-heating.

No indication for hydrogen evolution was observed at the cathode side during the second part of the experiment. The concentration of the KOH solution increased from 10.4% (w/w) to 21.0% (w/w). The volume of the catholyte was increased by about 5 cc. In the anode side, the anolyte solution turned into a paste-like, essentially solid material (aluminum hydroxide).

FIG. 9 depicts voltage vs. time curves recorded for the two parts of the experiment. The constant curve (V~3 volts, darker curve) corresponds to the voltage measured during the first part of the experiment. The periodic, non-continuous lighter curve intermittently reaching values of 5 volts, followed by sharp drop, was recorded during the second part of the experiment.

Example 6

Electrolyte Regeneration by Two-Step Electrolysis

Figure 11:
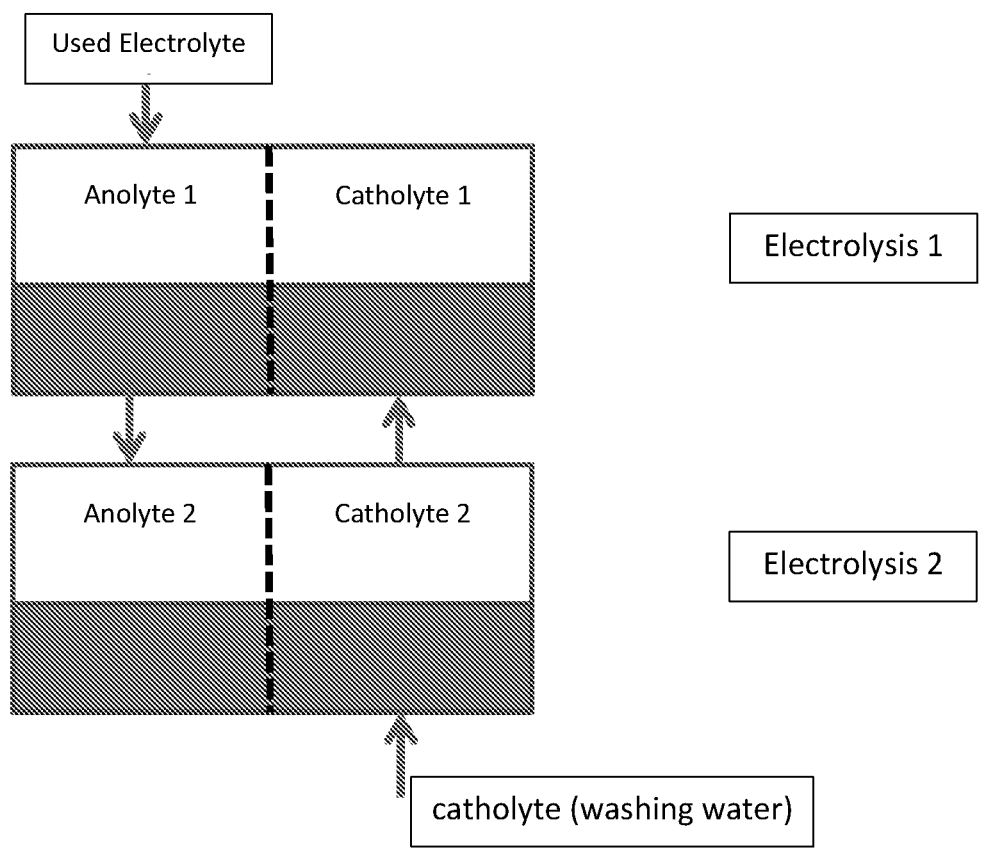
FIG. 11 is a schematic of a two-step electrolysis process for regenerating an electrolyte.

FIG. 11 schematically shows an example of electrolyte regeneration by a cascade two-step electrolysis, wherein moderately spent electrolyte was taken as a source of alkalinity and was introduced to anode compartment 1 of the first electrolysis cell. A KOH solution was introduced to the cathode compartment of the first electrolysis cell and a first electrolysis step was conducted by passing current through the cell.

Figure 12:
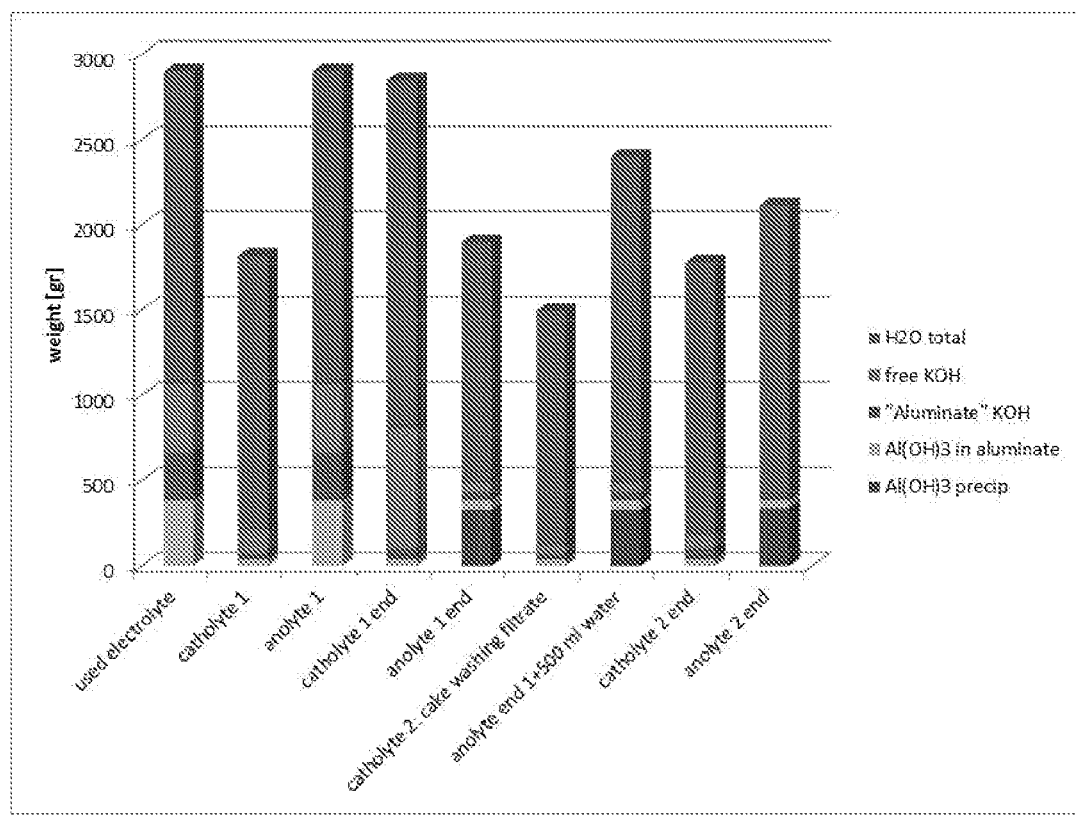
FIG. 12 is a bar diagram showing chemical concentrations during a two-step electrolysis regeneration process of spent electrolyte.

During electrolysis, K$^+$ ions transferred from the anode compartment to the cathode compartment of cell 1 and Al(OH)$_3$ precipitated in anode compartment 1. Accordingly, KOH concentration in the catholyte had increased and KOH concentration in the anolyte had decreased. The concentrations of the various chemicals present in the anolyte and in the catholyte before and after the first electrolysis step are shown in table 1 below and in FIG. 12.

Following this first electrolysis step, anolyte 1 was transferred to the anode compartment of the second electrolysis cell. The catholyte solution in the second catholyte compartment was a KOH solution. Electrolysis was conducted by passing current through electrolysis cell 2. During this second electrolysis process, K$^+$ ions transferred from the anode compartment to the cathode compartment of cell 2 and Al(OH)$_3$ precipitated in anode compartment 2. Accordingly, KOH concentration in the catholyte had increased and KOH concentration in the anolyte had decreased. The concentrations of the various chemicals present in the anolyte and in the catholyte before and after the second electrolysis step are shown in table 1 below and in FIG. 12. As can be seen from table 1, solutions were loaded by weight (see for example the bottom "total" row in table 1, weight in grams).

Following the second electrolysis step (electrolysis 2), the total mass of KOH in the anolyte had decreased from 85 g to 20 g. At the same time, the total mass of KOH in the catholyte had increased from 80 g to 145 g. It should be emphasized that the anolyte for the second electrolysis process in the second cell is taken from the first cell following the first electrolysis step. However, the catholyte for the second electrolysis step is not taken from the first electrolysis cell. The catholyte for electrolysis 2 is introduced from a prepared KOH solution or from the washing water of other processes wherein the washing water comprise KOH. Such washing water comprising KOH can result from the washing of the solids that precipitate in anolyte 1

TABLE 1

| components [gr] | used electrolyte | Electrolysis 1 | | | | Electrolysis 2 | | | |
|---|---|---|---|---|---|---|---|---|---|
| | | catholyte 1 | anolyte 1 | catholyte 1 end | anolyte 1 end | catholyte (washing water) | anolyte end 1 + 500 ml water | catholyte 2 end | anolyte 2 end |
| H$_2$O total | 1826 | 1600 | 1826 | 2029 | 1397 | 1376 | 1897 | 1592 | 1681 |
| free KOH | 407 | 149 | 407 | 722 | 74 | 51 | 74 | 89 | 11 |
| "Aluminate" KOH | 279 | 29 | 279 | 56 | 42 | 28 | 42 | 56 | 35 |
| total KOH | 686 | 178 | 686 | 779 | 85 | 80 | 85 | 145 | 20 |
| Al(OH)$_3$ dissolved | 388 | 40 | 388 | 40 | 59 | 40 | 59 | 40 | 49 |
| Al(OH)$_3$ precip | | | | | 329 | | 329 | | 339 |
| total Al(OH)$_3$ | 388 | 40 | 388 | 40 | 388 | 40 | 388 | 40 | 388 |
| total | 2900 | 1778 | 2900 | 2848 | 1870 | 1496 | 2370 | 1778 | 2089 |

Experimental details were as follows: The electrolysis cell was made of alkali-resistant transparent plastic (Perspex®). The cell was constructed as a closed box, hermetically divided by membrane assembly into two half-cells of equal volume. Both half-cells were enabled by breathing openings, and liquid inlet and outlet for liquid circulation, enforced by peristaltic pumps.

The membrane assembly was prepared from two grid-like frames, with a sheet of Neosepta CMX ion exchange membrane in between. Membrane assembly was incorporated into the cell (210.25 cm$^2$ membrane area) and tested for liquid-tight sealing.

Electrodes were arranged in the half-cells, on the walls opposite to the membrane. Nickel plate was used as an electrode in the anodic part of the cell. Air-breathing cathode (Phinergy) was incorporated in the opening in the wall of the cathodic part. The electrolysis process was carried out at room temperature, but because of current transfer certain self-heating (up to 35-40° C.) occurred.

The process (both electrolysis 1 and 2) was started at constant current density 95 mA/cm$^2$ (per membrane area), then, when cell voltage reached a limitation of 3.5V—gradual current decrease was automatically performed (to prevent the cell voltage to exceed the limit).

Electrolysis 1 was carried out during 16 hours, total 344.24 Amp-hours of current passed through the system. Electrolysis 2 was carried out during 6 hours, total 129.09 Amp-hours of current passed through the system.

It can be seen from table 1 and from bar diagram (FIG. 12) that following the first electrolysis step (electrolysis 1), the total mass of KOH in the anolyte had decreased from 686 g to 85 g. At the same time, the total mass of KOH in the catholyte had increased from 178 g to 779 g.

compartment during the first electrolysis step, or from the washing of solid precipitate that was separated from the spent electrolyte solution prior to performing electrolysis 1.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An electrolyte regeneration device comprising membrane electrolysis cell having spaced apart anode and oxygen-consuming cathode, with cation exchange membrane placed in the space between said anode and cathode defining an anode compartment and cathode compartment, wherein said anode compartment comprises anolyte solution, said anolyte solution comprises an hydroxide complex anion.

2. The device of claim 1, wherein the anode compartment and cathode compartment are connected to anolyte and catholyte circulation lines, respectively, with solid/liquid separation means placed in, or in fluid communication with, said anolyte circulation line.

3. The device of claim 2, wherein a first tank which contains an alkali salt of hydroxide complex anion is connected to the anolyte circulation line and a second tank which contains alkali hydroxide is connected to the catholyte circulation line.

4. The device of claim 1, wherein said anode compartment and said cathode compartment are connected to allow passage of oxygen from the anode side to the outer face of said cathode.

5. An electrolyte regeneration device comprising a first and a second membrane electrolysis cells, each cell comprising an anode and an oxygen-consuming cathode, with cation exchange membrane placed in the space between said anode and said cathode defining an anode compartment and cathode compartment, wherein said anode compartment comprises anolyte solution, said anolyte solution comprises an hydroxide complex anion, and wherein the anode compartments of the first and the second membrane electrolysis cells are connected and the cathode compartments of the first and the second membrane electrolysis cells are connected.

6. The device of claim 5, wherein at least one of said anode compartments and cathode compartments are connected to anolyte and/or catholyte circulation lines, respectively, with solid/liquid separation means placed in, or in fluid communication with, said anolyte circulation line.

7. An electrochemical energy generation apparatus comprising:
   (i) metal/air battery provided with an electrolyte reservoir for circulating electrolyte;
   (ii) an electrolyte regeneration device according to claim 1, wherein at least one of the compartments of said membrane electrolysis cell(s) is in fluid communication with said electrolyte reservoir of said metal/air battery.

8. An electric vehicle powered by metal/air battery and optionally by means of other power sources, comprising a reservoir for holding the electrolyte of said metal/air battery wherein said reservoir is in fluid communication with the electrolyte regeneration device of claim 1.

\* \* \* \* \*